United States Patent
Fujioka et al.

(10) Patent No.: US 6,679,774 B2
(45) Date of Patent: Jan. 20, 2004

(54) TRAINING-STYLE VIDEO GAME DEVICE, CHARACTER TRAINING CONTROL METHOD AND READABLE STORAGE MEDIUM STORING CHARACTER TRAINING CONTROL PROGRAM

(75) Inventors: Kenji Fujioka, Nishinomiya (JP); Hideto Inoue, Ashiya (JP); Naoki Nishikawa, Kobe (JP); Hiroshi Miyaoka, Osaka (JP)

(73) Assignee: KCEO Inc., Osaka (JP)

( * ) Notice: Subject to any disclaimer, the term of this patent is extended or adjusted under 35 U.S.C. 154(b) by 0 days.

(21) Appl. No.: 09/800,545

(22) Filed: Mar. 7, 2001

(65) Prior Publication Data

US 2002/0160835 A1 Oct. 31, 2002

(30) Foreign Application Priority Data

Mar. 8, 2000 (JP) ........................................ 2000-064115

(51) Int. Cl.[7] ................................................. A63F 9/22
(52) U.S. Cl. ................................ 463/1; 463/4; 463/44; 463/35
(58) Field of Search .......................... 463/1, 4, 44, 35, 463/8–9

(56) References Cited

U.S. PATENT DOCUMENTS

| | | | |
|---|---|---|---|
| 4,858,930 A | * | 8/1989 | Sato ........................ 273/85 G |
| 5,752,883 A | | 5/1998 | Butcher et al. |
| 5,885,156 A | | 3/1999 | Toyohara et al. |
| 6,165,068 A | * | 12/2000 | Sonoda et al. .................. 463/8 |

OTHER PUBLICATIONS

"Tokimeki Memorial Game", by Tokumashoten Intermedia Kabushiki Kaisha, pp. 10 to 13, Dec. 10, 1995.
"Special method of wining Super Famicom, Princess manufacturing gam, how to raise my daughter" by Kabushiki Kaisha Keibunsha, pp. 32 to 35 and 46, Jan. 10, 1996.
"Gangriphon" sold by Kabushiki Kaisha Game Arts in 1996.
"Golden Gate—Main Review" 'Online!, Apr. 1997 pp. 1–3.

* cited by examiner

Primary Examiner—S. Thomas Hughes
Assistant Examiner—Carmen D. White
(74) Attorney, Agent, or Firm—Jordan and Hamburg LLP

(57) ABSTRACT

A character is trained to have abilities and characteristics desired by the player, on a probability basis, without significantly reflecting the level of game playing skill of the player. A main character and game images are displayed on a monitor, and a main character is caused to move to various battle fronts by commands from an operating section. Training for increasing various ability values is performed by executing prescribed tasks. A ROM cassette stores scene images, actions for each scene, and abilities, in accordance with the success or failure of action results. The character can implement actions with a prescribed success probability, according to one specified scene. Plus or minus points are applied to the corresponding ability values in accordance with the success or failure of the action result, and actions are implemented at each one of successively selected scenes until a game time period has been cleared.

16 Claims, 52 Drawing Sheets

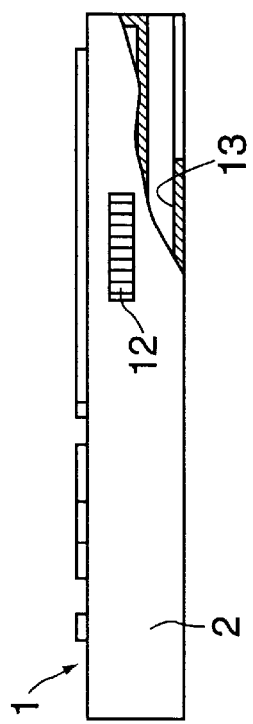
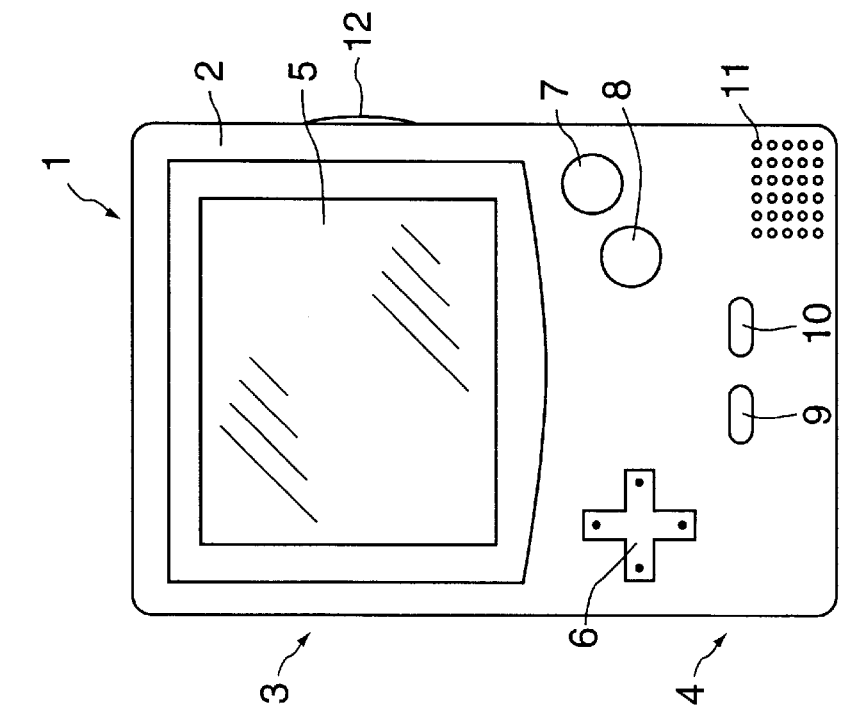

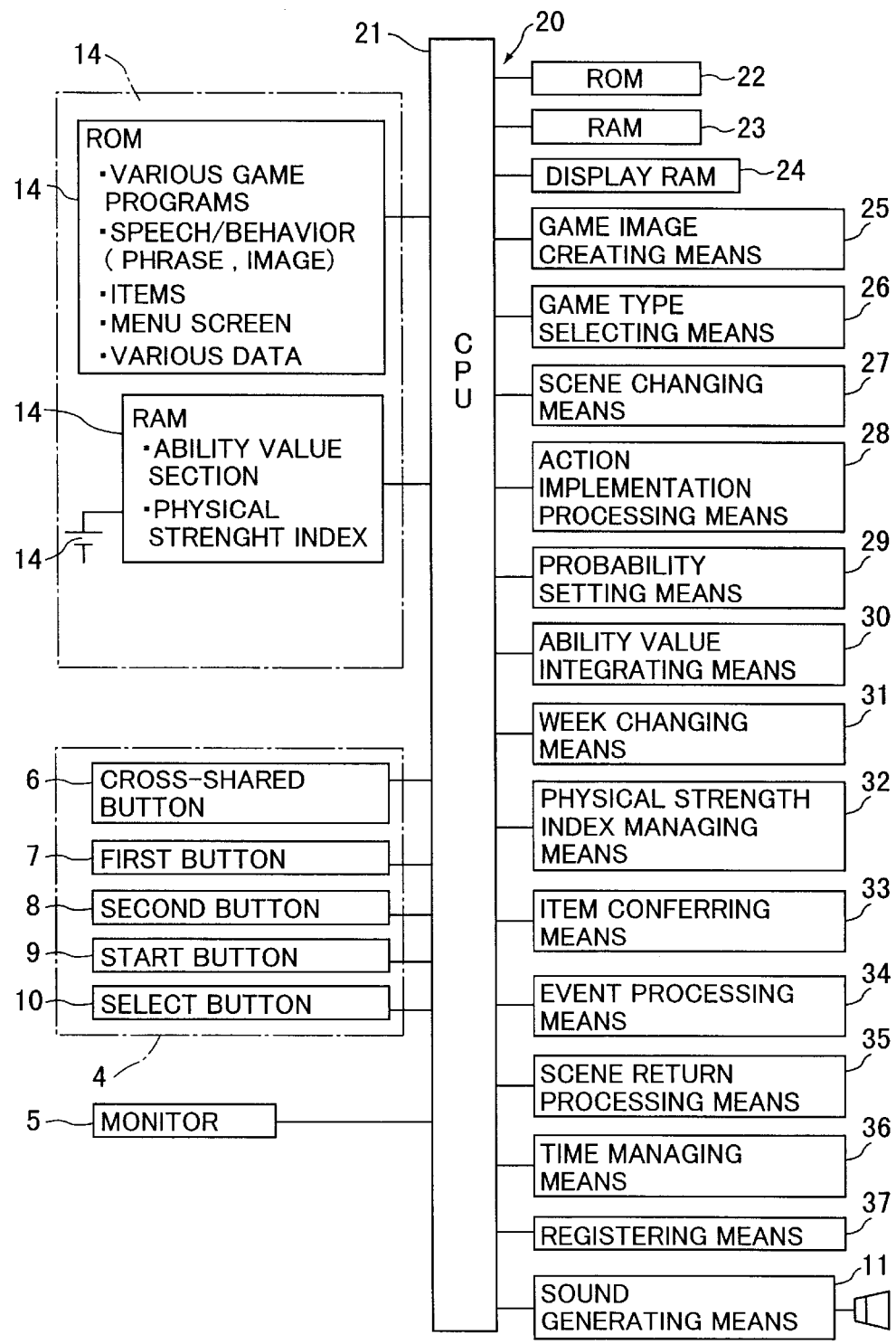

GAME START MENU

BATTLE VERSION ENTRY MENU

START

NAME ENTRY SCREEN

SELECTING FIELD POSITION

SELECTING PITCHING STYLE

SELECTING TEAM

INITIAL SETTINGS SCREEN

SELECTION SCREEN

BATTLE MAIN SCREEN

SELECTING MISSION

DURING MISSION

INCREASING ABILITY DURING MISSION

ON VOYAGE

SCREEN AT COMMAND SECTION

WESTERN FRONT

SOUTHERN FRONT

NORTHERN FRONT

ENCHANTED ISLAND

DR.DAIJOBU'S ISLAND

RETREAT POSSIBLE

DIED ON MISSION

GAME OVER

PLAYER CREATED

LIST OF PLAYERS CREATED

FIG.32

CREATING PLAYERS

RIGHT OR LEFT HANDED ?

| NAME | ITO |
|---|---|

| TEAM | OREX |
|---|---|
| CALLS SELF | I |
| LEFT / RIGHT HANDED | THROWS RIGHT / BATS LEFT |

| FIELDING | |
|---|---|
| FORM | |
| INTERESTS | |

END

| THROWS RIGHT / BATS RIGHT | THROWS RIGHT / BATS LEFT | THROWS RIGHT / SWITCH HITTER |
|---|---|---|
| THROWS LEFT / BATS RIGHT | THROWS LEFT / BATS LEFT | THROWS LEFT / SWITCH HITTER |

FIG.34

| ☺× | ITO | | | ☺× | SHIRT NUMBER | 50 | |
|---|---|---|---|---|---|---|---|
| | FIRST YEAR | 24 YEARS OLD | PHYSICAL CONDITION | ☺ | EAGERNESS | ☹ | WEEK 2 IN FEBRUARY |

" I'M GOING TO DO SHORT SPRINTS "

| BATTING | BATTING TEE | SPRINTING | RUN IN | CATCHING BALLS REAL | FIELDING | MUSCLE TRAINING | RETURN |

FIG.37
|  | ITO | | Ox | SHIRT NUMBER | 50 | WEEK 1 IN FEBRUARY |
|---|---|---|---|---|---|---|
| | FIRST YEAR | 24 YEARS OLD | PHYSICAL CONDITION  | EAGERNESS |  | |
" I'M CONTACTING THE COACH "
| COACH | TEAM MATE | HOME | | | | | RETURN |
|---|---|---|---|---|---|---|---|

FIG.40

5TH TURN AT BAT

FLY BALL  STRIKE  STRIKE THREE  HIT

FIG.42

IMPROVING ABILITY

|  | STRENGTH | AGILITY | TECHNIQUE |
|---|---|---|---|
| REMAINING EXPERIENCE POINTS | 36 | 65 | 44 |

RETURN

| | | | | CURRENT ABILITY | AFTER CHANGE |
|---|---|---|---|---|---|
| MEET CIRCLE | 10 | | 20 | D | D |
| BATTING POWER | 4 | | | 65 | → 65 |
| RUNNING STRENGTH | | 40 | 10 | 8D | → 8D |
| SHOULDER STRENGTH | 24 | 5 | 5 | 8D | → 8D |
| FIELDING | | 10 | 32 | 8D | → 8D |
| CHANCE | 15 | 15 | 15 | | |

MEET CURSOR SIZE WHEN BATTING

FIG.43

IMPROVING ABILITY

|  | STRENGTH | AGILITY | TECHNIQUE |
|---|---|---|---|
| REMAINING EXPERIENCE POINTS | 0 | 2 | 2 |

CURRENT ABILITY    AFTER CHANGE

|  | STRENGTH | AGILITY | TECHNIQUE |
|---|---|---|---|
| AGAINST TO LEFT-HANDER | 15 | 15 | 15 |
| BUNT |  |  | 30 |
| INFIELD HIT |  | 80 | 40 |
| POWER BATTER | 80 | 20 | 30 |
| AVERAGE HITTER | 30 | 20 | 30 |
| HEAD SLIDING |  | 20 | 20 |
| BASE STEALING |  |  |  |

SLIDES INTO FIRST BASE IN RISKY SITUATIONS

FIG.44

IMPROVING ABILITY

|  | STRENGTH | AGILITY | TECHNIQUE |
|---|---|---|---|
| REMAINING EXPERIENCE POINTS | 4 | 50 | 7 |

RETURN

| | STRENGTH | AGILITY | TECHNIQUE | CURRENT ABILITY | AFTER CHANGE |
|---|---|---|---|---|---|
| MEET CIRCLE | 10 | | 30 | D | D |
| BATTING POWER | 4 | | | 65 | → 67 |
| RUNNING STRENGTH | | 40 | 10 | 8D | → 8D |
| SHOULDER STRENGTH | 24 | 5 | 5 | 8D | → 9D |
| FIELDING | | 10 | 32 | 8D | → 9D |
| CHANCE | | GAINED | | | |

STRENGTH TO HIT THE LONG BALL

TRAINING-STYLE VIDEO GAME DEVICE, CHARACTER TRAINING CONTROL METHOD AND READABLE STORAGE MEDIUM STORING CHARACTER TRAINING CONTROL PROGRAM

BACKGROUND OF THE INVENTION

1. Field of the Invention

The present invention relates to a training-style video game device wherein a competitor character on a video screen is trained by being made to undertake simulated experiences (role-playing) in the place of the player, and it also relates to a character training control method and a readable storage device for storing a character training control program.

2. Description of the Related Art

Known role-playing games wherein a player trains a main character of a video screen include games wherein the player is made to select a menu from a variety of previously prepared menus, including a practice menu, and the main character is then made to implement the selected menu. There are known examples of such a training game wherein, when a practice menu is implemented in accordance with the main character and the character's attribute data at that time, events associated an increase or decrease in abilities, or probabilities relating to same, are generated, for instance, and by implementing such a menu repeated times, the player aims to improve the character's various abilities, such as muscular strength, agility and technique, represented by experience points, in such a manner that the main character is ultimately trained to have the abilities and characteristics desired by the player. The main character having completed training is stored in a game storage medium as a registered competitor, and when the player subsequently plays a separate competitive game, this trained competitor character is made to appear in the competitive game and the game playing operations are executed and controlled in accordance with the character's ability and characteristic parameters developed through training, thereby increasing the interest generated by the competitive game.

Since various other types of menu, such as 'rest', and the like, are prepared in the aforementioned training game, as well as the actual practice menu, there has been some variation in the training achieved when the competitor character is trained by the player to have desired characteristics and abilities, but this has not necessarily been easy to achieve. Therefore, the game has been difficult to learn for a player not having good game playing skill, in other words, a player of beginner level, and it has been sought to develop a training game having training modes which have little correlation with the playing skill of the player, namely, a combination of a training mode for high operating skill in parallel with a training mode where operating skill is not particularly required, which can thus be enjoyed sufficiently even by players of little experience.

SUMMARY OF THE INVENTION

The present invention was devised with the foregoing in view, an object thereof being to provide a training-type video game device which is capable of training a character having abilities and characteristics desired by a player, on a probability basis, without significantly reflecting the level of operating skill of the player in the training of the character, and to provide a character training processing control method, and a readable storage medium storing a character training processing control program.

The readable storage medium storing a character training control program according to the first aspect of the invention is such that, in a character training game in which game screens containing a main character are displayed on a monitor and a plurality of types of ability values set for the main character are respectively increased as the main character is caused to performed prescribed actions in accordance with commands from an operating member, ability values for desired abilities are improved by: providing respective images for a plurality of scenes as game images; preparing one or more predetermined actions for the main character at each scene, while previously setting plus or minus points for one or more specific abilities of the plurality of types of abilities in accordance with the success or failure of each action result; specifying one of the scenes selectively according to operations of the operating member; causing the main character to perform one or more actions with a prescribed success probability at the specified scene; adding or subtracting the specified plus or minus points to or from the corresponding ability values according to the success or failure of the execution result; and implementing the aforementioned actions at each one of successively selected scenes until prescribed conditions are reached.

The character training control method according to the thirteenth aspect of the invention is a character training control method for a character training game in which game screens containing a main character are displayed on a monitor and a plurality of types of ability values set for the main character are respectively increased as the main character is caused to perform prescribed actions in accordance with commands from an operating member, whereby ability values for desired abilities are improved by the steps of: providing respective images for a plurality of scenes as game images; preparing one or more predetermined actions for the main character at each scene, while previously setting plus or minus points for one or more specific abilities of the plurality of types of abilities in accordance with the success or failure of each action result; specifying one of the scenes selectively according to operations of the operating member; causing the main character to perform one or more actions with a prescribed success probability at the specified scene; adding or subtracting the specified plus or minus points to or from the corresponding ability values according to the success or failure of the execution result; and implementing the aforementioned actions at each one of successively selected scenes until prescribed conditions are reached.

The fourteenth aspect of the invention is a training-style video game device for training a character by displaying game screens containing a main character on a monitor and respectively increasing a plurality of types of ability values set for said main character as the main character is caused to performed prescribed actions in accordance with commands from an operating member, comprising: first storing means for storing images for a plurality of scenes as game images; second storing means for previously storing plus or minus points for one or more specific abilities of said plurality of types of abilities in accordance with one or more action contents for each scene and the success or failure of the action result; action processing means for causing said main character to perform said actions with a prescribed success probability at the specified scene, in accordance with one of said scenes being specified selectively according to the operations of said operating member; calculating means for adding or subtracting said plus or minus points to or from the corresponding ability values according to the success or failure of the execution result; and development processing means for causing said action processing means to implement actions at each one of successively selected scenes, until prescribed conditions are reached.

According to these compositions, game images containing the mc are displayed on the monitor, and when a selection command is issued by the operating member on a selection screen, the main character is made to implement prescribed actions accordingly. When the actions set for the main character are completed, the plurality of types of ability values set for the actions are increased respectively.

Firstly, images for a plurality of scenes are prepared as game scenes, and one or more predetermined actions are prepared for the main character, for each of these scenes. Plus or minus points are previously determined for specific abilities of the one or more types of the plurality of types of abilities, in accordance with the success or failure of each action result. When one of the scenes is specified selectively according to the operations of the operating member, the character is caused to execute one or more actions at the specified scene, with a prescribed success probability which is specified or generated randomly. The implementation result for this action is determined as a success or failure according to the success probability, and according to this success or failure, the predetermined plus or minus points are applied to the corresponding ability values, whereby it is sought to increase the respective ability values according to the results of the actions. Desired scenes are selected and the actions are implemented repeatedly in a successive manner, until prescribed conditions are met, for instance, until a number of scenes visited or a threshold time set for the game is passed, or until a predetermined game end is reached, and it is sought to increase the ability values corresponding to desired abilities by carrying out respective tasks at each selected scene, thereby training the character in a direction (towards abilities, characteristics, and the like) desired by the player.

These and other objects, features and advantages of the present invention will become more apparent upon reading of the following detailed description along with the accompanied drawings.

BRIEF DESCRIPTION OF THE DRAWINGS

FIG. 1A and FIG. 1B are diagrams for describing the composition of a video game device to which the character training control method relating to one embodiment of the present invention is applied: FIG. 1A is a plan view and FIG. 1B is a side view;

FIG. 2 is a block diagram showing the control composition of the video game device shown in FIG. 1;

FIG. 32 is a diagram for inputting personal data for identifying a new player;

FIG. 34 is a diagram showing a screen where "Camp" has been selected;

FIG. 37 is a diagram showing a screen where "Telephone" has been selected;

FIG. 40 is a diagram of a screen showing the results of a trial appearance;

FIG. 42 is a diagram showing a screen where "Upgrade ability" has been selected;

FIG. 43 is a diagram showing a screen where "Upgrade ability" has been selected, in a scrolled state;

FIG. 44 is a diagram showing a screen corresponding to FIG. 15, after "Upgrade ability" has been implemented;

DESCRIPTION OF THE PREFERRED EMBODIMENTS

Figure 3:
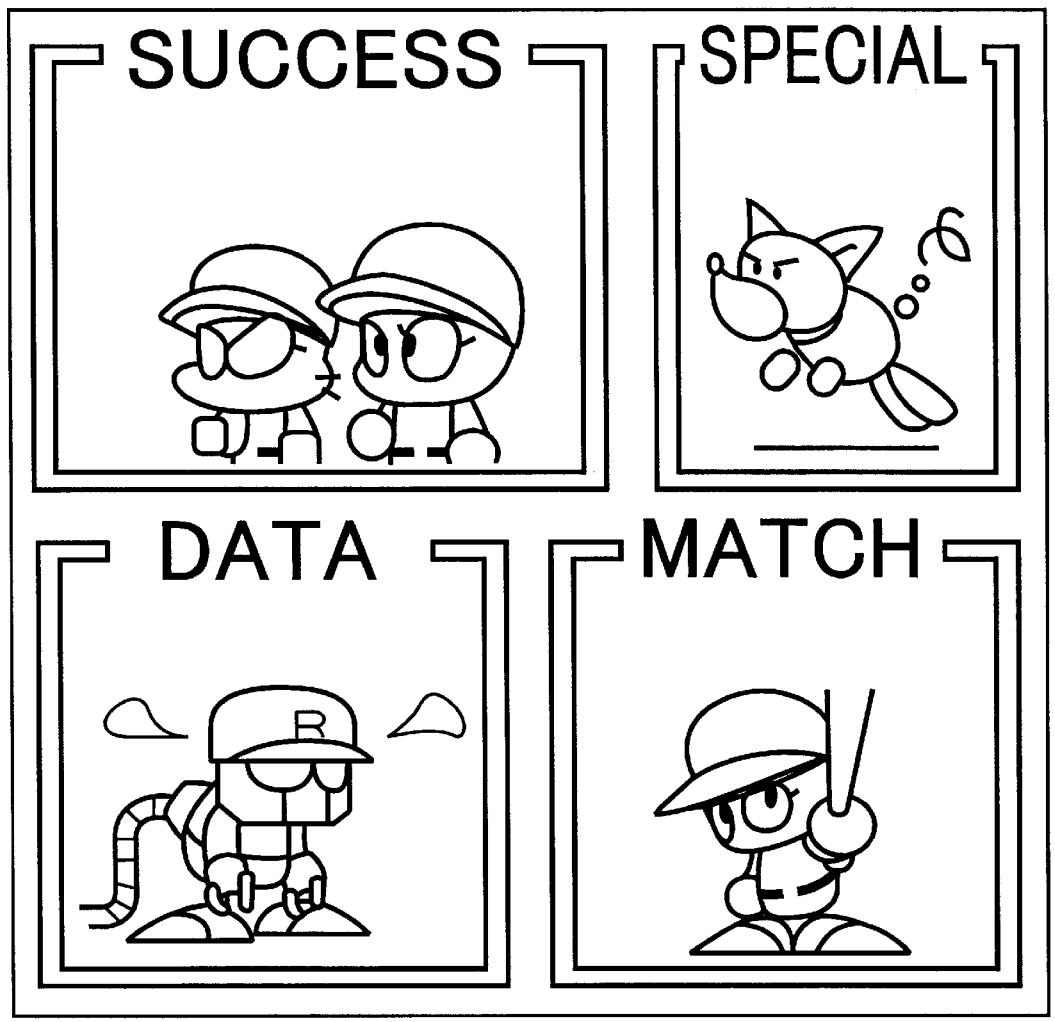
FIG. 3 is a diagram illustrating a game scene displayed on a monitor.

FIGS. 1A and 1B show a training-style video game devices in which the character training control method relating to one embodiment of the present invention is applied: FIG. 1A is a plan view; and FIG. 1B is a side view. In these diagrams, the video game device 1 is a portable-type device, and is constituted by an outer case 2 containing a control section and the like, a display section 3 formed on the upper portion of the surface of the outer case 2, and an operating section 4 formed on the lower portion of the surface of the outer case 2.

A monitor 5 consisting of a liquid-crystal panel, or the like, capable of displaying game images, is disposed in the display section 3. The operating section 4 is constituted by a cross-shaped button 6 disposed on the left-hand side thereof, a first button 7 and second button 8 disposed on the right-hand side, and a start button 9 and select button 10 disposed in the region below and between the cross-shaped button 6 and the first and second buttons 7, 8.

A sound generating section 11 is formed in the right-hand corner region of the lower portion of the outer case 2, and a volume adjusting section 12 is disposed on the right-hand side of the outer case 2. Moreover, a ROM cassette installing section 13 is formed in the upper half of the rear face of the outer case 2. In this embodiment, the video game device 1 is capable of implementing various games, such as a 'success' game for training a new competitor selected by the player from a scrub team member into a major league team member, competitive games for forming a baseball team from competitors trained by the player, or the like, and having a match with an opposing team, and training games relating to the present invention (success battle version game), and the like.

Before the start of the game, the monitor 5 selectively displays a game type selection screen and various data input screens, or the like, according to requirements, and after the start of the game, it displays a plurality of images, or the like, relating to the game contents, as appropriate.

The cross-shaped button 6 instructs a cursor movement in a direction corresponding to the four directions, up/down/left/right, on the screen of the monitor 5, and by operating the first and second buttons 7, 8, or the like, in combination, for example, individual data for a main character is registered, prescribed actions are executed, and prescribed selection commands corresponding to the cursor position are executed. Furthermore, in the competitive game, this button is used to move a meet cursor for adjusting the meet position for a batter, specifying the base to which the batter runs, specifying the type of ball for a pitcher, and indicating other movements of the player, the base to which to throw the ball, and so on.

The first button 7 indicates a selection status decision (confirmation) by the cross-shaped key 6, and in a competitive game, it is used, for instance, to cause the batter to make a swing, or in combination with the cross-shaped button 6, to make a runner return to a specified base, or to instruct the pitcher to start pitching, make a fielder do a 'fine play', or the like. Moreover, in a competitive game, the second button 8 is used, for instance, to specify either a normal or strong swing of the bat, or in combination with the cross-shaped button 6, to make a runner steal a base, or in combination with the cross-shaped button 6, to specify the base that a safety ball is to be thrown to, or to throw a ball in relay fashion, or the like.

The start button 9, apart from starting the game, is used in a competitive game, for instance, in combination with the cross-shaped button 6, to specify a punt, or to specify a change of pitcher or fielder. The select button 10, apart from serving to select the game type, is used, for instance, to return the meet cursor to the central position on the base.

The sound generating section 11 is constituted by incorporating speakers on the inner side of the outer case 2, and it outputs prescribed game sounds and sound effects, or the like, in accordance with the progress of the game. The volume adjusting section 12 adjusts the volume of the game sounds, sound effects, and the like, output from the speaker. The ROM cassette installing section 13 is used to accommodate a ROM cassette 14 in a detachable fashion, a connector being disposed therein in such a manner that a connector attached to the front end section of a ROM cassette 14 can be connected electrically with the internally housed control section, by insertion of the ROM cassette.

In a video game device 1 composed in this manner, the player holds the right and left-hand sides of the outer case 2 with both hands, and by, for instance, operating the cross-shaped button 6 with his or her left thumb, whilst pressing and operating the first and second buttons 7, 8, the start button 9 and the select button 10, appropriately and selectively, with his or her right-hand, the player is able to play a success game, success battle version game, competitive game, or the like.

FIG. 2 is a block diagram showing one example of a control composition of the video game device 1. This diagram illustrates a mode which is centred on execution of a success battle version game for training a new baseball competitor (character). Therefore, if executing another game stored in the ROM cassette 14 forming a storage medium, for example, a competitive game, then it is necessary to have a game program which follows the rules of baseball, and various control means for implementing this program. Possible storage media include a so-called ROM cassette wherein a ROM, or the like, storing the aforementioned game data and program data is accommodated inside a plastic case, an optical disk, flexible disk, or the like, and also include storage media mounted directly on a game circuit board.

In the diagram, the control section 20 executes game processing in accordance with commands corresponding to the controls performed at the operating section 4, on the basis of the game program and various data, such as image data, and the like, forming one element of the game, which are stored on the ROM cassette 14 forming the storage medium. The control section 20 is constituted by a CPU 21 for performing calculation processing, a ROM 22 storing a control program for controlling the display output to the monitor 5, and the like, a RAM 23 for temporarily storing processing data, and a display RAM 24 having storage capacity for at least one frame, for updating and storing frame images for supply to the monitor 5, in a readable fashion. The display RAM 24 repeats a write operation and read operation, alternately, at a cycle of $\frac{1}{60}^{th}$ second, for example, whereby a stable image due to the latent image effect is displayed on the monitor 5.

The CPU 21 is connected to the monitor 5, cross-shaped button 6, first and second buttons 7, 8, start button 9, select button 10 and sound generating section 11, and it also connects with the ROM cassette 14.

Moreover, the CPU 21 is also provided with various function realizing means, such as game image forming means 25, type selection processing means 26, scene change processing means 27, action execution processing means 28, probability setting means 29, ability value calculating means 30, week changing means 31, physical stamina index managing means 32, item acquiring means 33, event processing means 34, scene revert processing means 35, time managing means 36, registering means 37, training start value setting means 38, and the like.

The ROM cassette 14 comprises a ROM 141 storing various game programs, previously determined game data and table data of various types (for example, addition/subtraction points) and basic screens required in developing the game, as well as a registration screen for characters (main character to be trained) and speech and action images (phrases indicating spoken words, images indicating actions of the main character and characters relating to the main character) items which have an effect on the training of the main character, various types of background scenes, a plurality of scene images which evoke in particular the mission destinations set in the game, map screens for providing a single view of the different scenes, and the like, and also sound effects data, in addition to which the ROM cassette also comprises a RAM 142 having a storage section for updating and storing various values for ability values and physical strength indices (or stamina index), and an internal back-up battery 143 for the RAM 142. The items which are acquired by the main character in the course of training are described hereinafter.

The game image forming means 25 determines game images according to the operational data from the cross-shaped button 6, first and second buttons 7, 8, start button 9 and select button 10 of the operating section 4, and the game program in the ROM 141 and the contents of the RAM 142, and it causes prescribed display screens to be formed in the display RAM 24.

The game type selecting means reads out a relevant game program from the ROM 14 in accordance with the selection of respective modes "Success", "Special", "Data", "Battle", as illustrated in FIG. 3, or the selection of respective modes "Mini Game", "Success Battle version", "Score" on the subsequent screen (FIG. 4) shown if "Special" is selected.

The respective compositions described below relate to game development in a case where "Success Battle version" is selected as the mode, and in the base that any other game mode is selected, then the corresponding game program is read out in such a manner that respective data are implemented by function realizing means (not illustrated), in accordance with the operational data from the operating section 4.

As illustrated in FIG. 6–FIG. 10 described below, a main character MC (see FIG. 10) simulating a baseball player and forming the character to be trained, is registered as a recruited team member in the RAM 141 according to the operation of the operating section 4.

Here, the contents of the "Success Battle version" game will be described in outline. When initial ability values of various types and an initial stamina index have been set for the main character to be trained in this game mode, a training procedure simulating a war scenario is implemented. In other words, a home country and a plurality of mission destinations are prepared as various scenes in the game, the character is dispatched to a desired mission destination according to operations performed by the player (corresponding to scene switching), the character is made to perform prescribed tasks (corresponding to actions) at the mission destination (the undertaking of one task corresponds to one week (time unit) in the time frame set in the game), and if the character succeeds in the mission (favourable action results), then a value (plus/minus points) corresponding to a prescribed type of ability is essentially added to the corresponding ability value of the character, whereas if the character fails in the mission (unfavourable action results), then plus/minus points corresponding to the prescribed type of ability are essentially subtracted from the corresponding ability value, and furthermore, the strength value of the character is increased or reduced according to the success or failure of the mission. Whenever the character has finished the tasks at a mission destination, he returns to his home country (corresponding to switching back the scene), and processing is repeated whereby the player selects a subsequent mission destination. By accomplishing tasks at the mission destinations selected in this way, it is sought to improve the various ability values of the main character, and hence to train the main character to have the type of abilities desired by the player. In this game, when the elapsed time reached a prescribed number of weeks (in the present embodiment, 200 weeks), the game is terminated and the character is registered in the ROM 141 with the ability values at that time, whereafter the character may appear as a competitor in a subsequent baseball match in a "competitive game" mode. Furthermore, if the stamina index of the character falls to a prescribed value or below, for example, if it falls to zero, in the course of training, then the character is not able to return to his home country and processing is implemented whereby, for example, the character receives a lowest value (setting prescribed low ability values) to indicate a training failure.

The scene change processing means 27 implements processing whereby the main character is dispatched to a mission destination specified selectively from a plurality of mission destinations previously prepared for the game, as illustrated in FIG. 12 to FIG. 23, in accordance with the selection result obtained by means of the player operating the cross-shaped button 6 of the operating section 4 at the screen illustrated in FIG. 11 (described below). As shown in the various diagrams (for example, FIG. 12, FIG. 18–FIG. 22), by depicting scene images on the monitor 5 screen which correspond to a mission destination, it is possible to enjoy a game in an atmosphere exactly equivalent to that of the main character moving to the relevant mission destination. Incidentally, the "Attack" symbol displayed roughly centrally on the screen in FIG. 12 indicates an attack, the "Upgrade" symbol indicates an add points operation, the "Look" symbol instructs display of the character data on the monitor 5, and the "Save" symbol instructs that the character data is stored (saved) in the RAM 142. When any one of these icons is specified by means of the operating section 4, corresponding processing is implemented.

Figure 13:
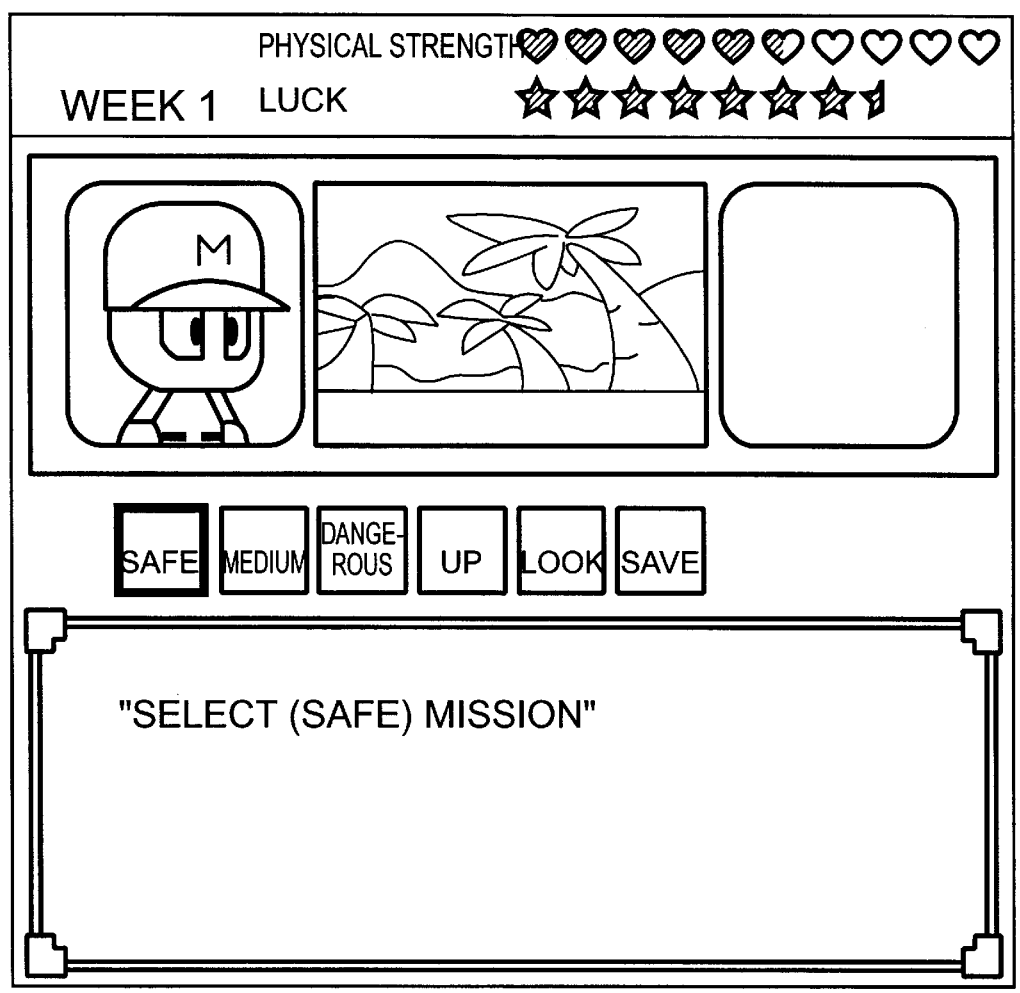
FIG. 13 is a diagram illustrating a game scene displayed on a monitor.
Figure 14:
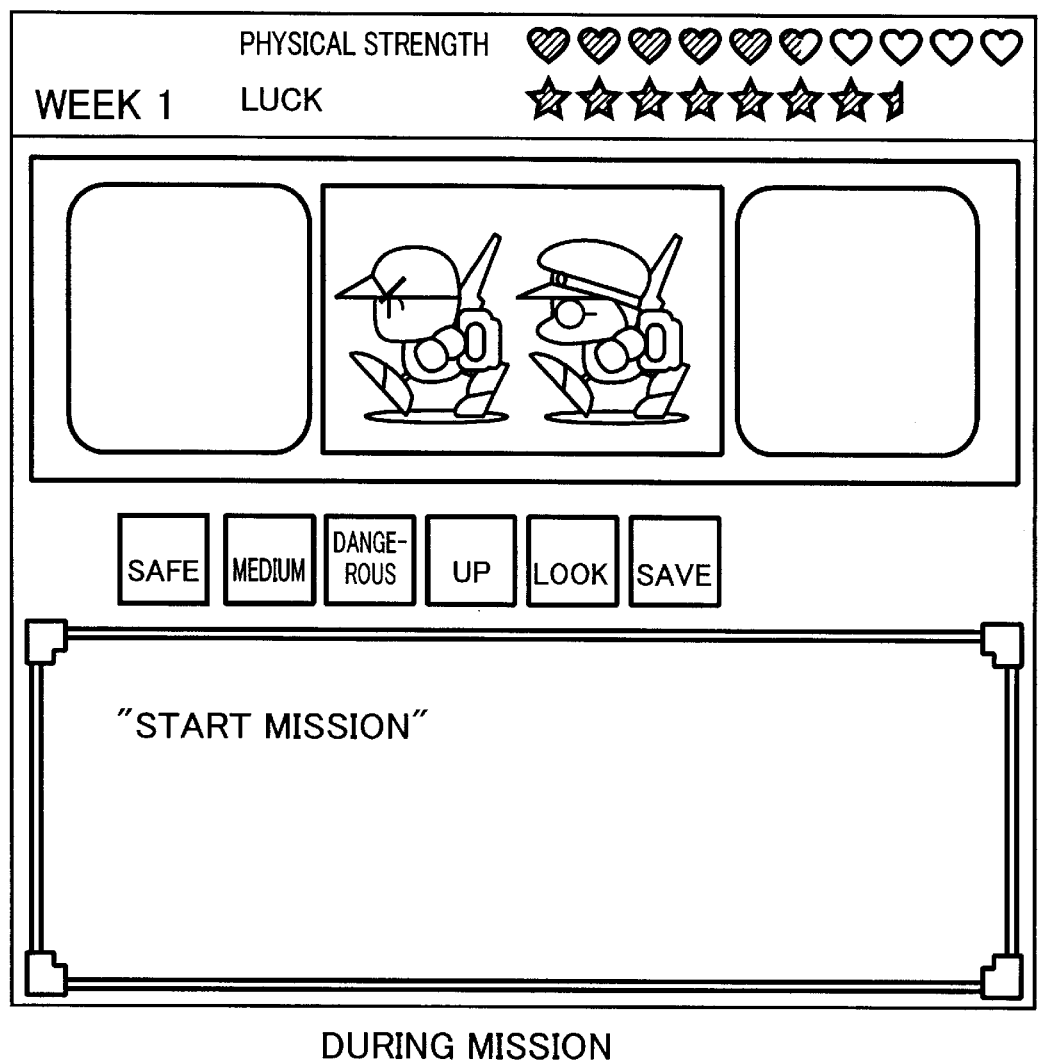
FIG. 14 is a diagram illustrating a game scene displayed on a monitor.

A plurality of types of tasks are prepared in the ROM 141 in accordance with the respective mission destinations (FIG. 18–FIG. 22). Moreover, in the present embodiment, three levels of difficulty (danger) are set for the tasks, corresponding to their complexity, in such a manner that the player can select a desired level of difficulty by means of the operating section 4. In FIG. 13, the "Safe" icon indicates low difficulty, "Medium" indicates medium difficulty, and "Dangerous" indicates high difficulty.

The action execution processing means 28 implements task commands randomly from the selected level of difficulty for the selected mission destination, and it also derives a result indicating whether the mission was accomplished successfully or whether it failed.

The probability setting means 29 sets a success probability for accomplishment of a task. The success probability may be set in a fixed manner according to the task and the level of difficulty, or alternatively, a setting method may be adopted where other factors are included, for example, whereby the success probability increases, the larger the stamina index (described hereinafter). Essentially, the level of difficulty corresponds to the success probability for the task, and the higher the level of difficulty, the lower the success probability that is set. In one example of a task success judgement method, a prescribed numerical value is previously set for the task, and success or failure is determined according to whether or not this value is matches by a value selected randomly from a prescribed range of values, each time the task is undertaken, (this being obtained through random number generating means, or the like). Furthermore, changes in the success probability can be achieved by broadening or narrowing the possible range of the randomly generated numbers.

Plus/minus points which are added to the ability values according to the mission destination, task, level of difficulty and task success/failure are previously set in the table data of the ROM 141. An ability is a feature that is displayed during a competitive game, and a plurality of types of ability are prepared, for example, basic muscular strength points, agility points, technique points (each of these types of points are generally termed "remaining experience points" in the "Success" mode described hereinafter), in addition to which, there are change ball points (high probability of gaining strike out with change ball) if the trainee character is a pitcher, left throw points (high probability of hit when throwing to left) if the trainee character is a fielder, and punt points (high punt success rate), power hitter points (high probability of hitting home run), running power (high probability of stealing case or wide fielding coverage), luck points which are unrelated to pitching or fielding (increasing success probability set by probability setting means 29), and the like.

Figure 12:
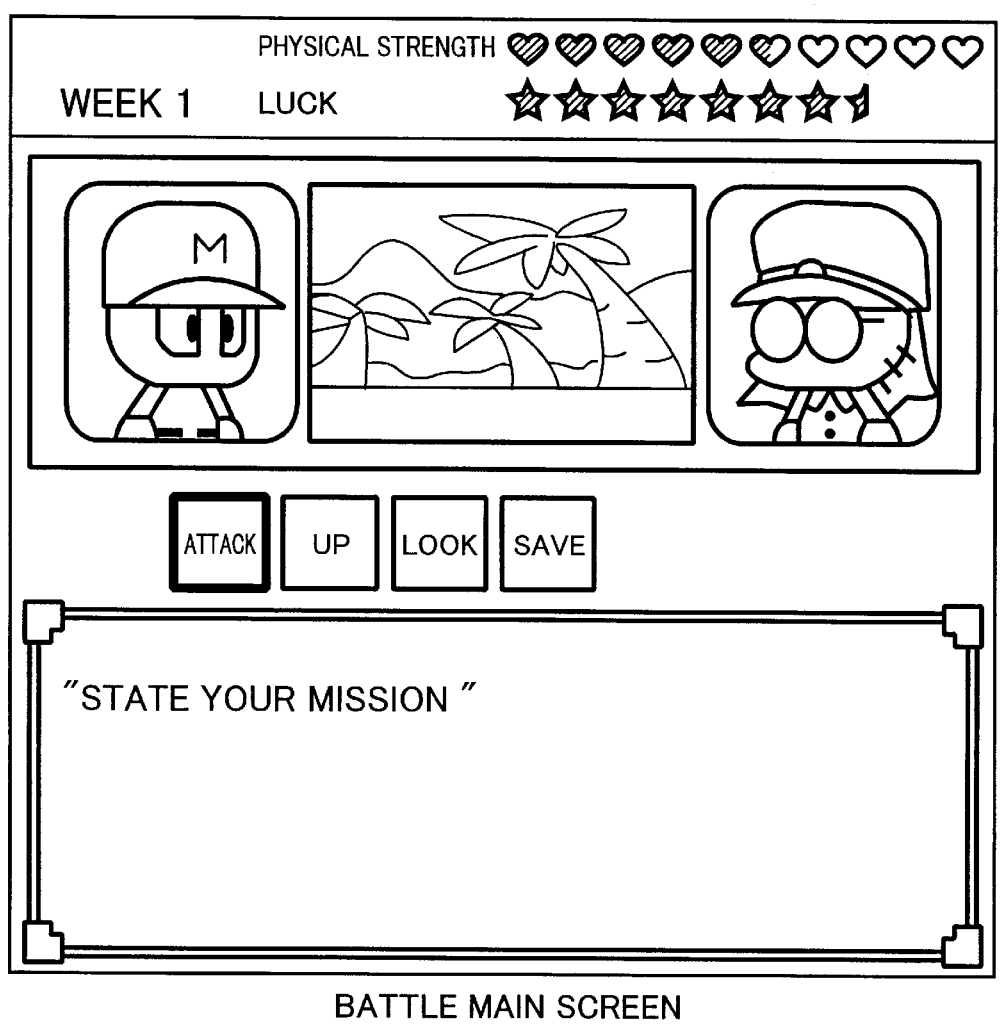
FIG. 12 is a diagram illustrating a game scene displayed on a monitor.

The add points operation indicated by the "Upgrade" icon in FIG. 12 means processing whereby the basic ability values of the ability values acquired in the present game, namely, the respective points for muscular strength, agility, and technique, are distributed respectively to the practical ability values, such as the aforementioned change ball points, and the like, which are required in the competitive baseball game, and in addition to displaying a basic ability value column and a practical ability value column in a table on the monitor 5, the acquired points are shown in the basic ability value column and the number of points required to move up one rank are shown in the practical ability value column, along with the current rank (symbol or number). In order to move a practical ability value up one rank, then in the case of change ball points, for example, it is specified and displayed that 5 muscular strength points, 5 agility points and 3 technique points are required. When a command is implemented to move this practical ability value up by one rank, the aforementioned number of points are automatically subtracted from the respective basic ability values. In this way, when the basic ability values have accumulated to a certain degree, the player selects "Upgrade" and processing is implemented for distributing the basic ability values to the practical ability values.

Now, the plus/minus points for each mission destination are described. In the present embodiment, the prepared mission destinations are "Northern front", "Western front", "Southern front", "Dr. Daijobu's Island" and "Enchanted Island".

In "Northern front", the stamina index and luck are reduced, but if the trainee character is a pitcher, then this change ball points are increased, and if he is a fielder, then his agility points are increased. At this front, it is supposed that there is a high number of tasks of generally low danger level compared to the other mission destinations, but on the other hand, the character may be attacked randomly by guerrillas, causing a task failure. At least four types of tasks are prepared for each danger level, and if the danger level is "safe", for example, then the set tasks will include "Propaganda activity" "Food procurement", "Railway maintenance", or the like, of which, for the "Railway maintenance" task, the task success result is set to: stamina index −5, luck points −2, change ball points +2, agility points +2. In the case that the character is attacked by guerrillas, then luck points −6 is set as the task failure result. If the character is successful in the "Propaganda activity" task, then he receives stamina index −5, luck points +4, change ball points +5, and if the character fails, then lower values are set accordingly.

At the "Western" front, the muscular strength is improved, but the stamina index is reduced. At this front, it is supposed that the commanding officer is very irrational and they unpleasant events are liable to occur. At least four types of task are prepared for each danger level, and if the danger level is 'safe', for example, then the task may be "Rear guard", or the like, the task success result for this task being set to: stamina index −5, luck points +1, muscular strength points +4. There is also set a 30% probability of encountering an enemy, and hence the success probability is 70%. If the character encounters the enemy, then the task failure result is set to: stamina index −6, luck points −3, muscular strength points +2.

At the "Southern front", technique improves, but the stamina index is reduced. This front is the most dangerous, and it is supposed that "starvation and disease" events are liable to occur. At least four types of task are prepared for each danger level, and if the danger level is "safe", for example, then the task may be "Find pilot", or the like, the task success result for this task being set to: stamina index −15, luck points +6, technique points +10. It is also set that there is a 53% probability of encountering the enemy, and hence the success probability is set to 47%. If the character encounters the enemy, then the corresponding task failure result is set to: stamina index −20, luck points −3, muscular strength points +6.

On "Dr. Daijobu's Island", the basic abilities and points can change significantly. Here, it is assumed that the character undergoes a dangerous operation (success probability 45%), this operation corresponding to the mission task. The operation success result is set to: agility points +40, muscular strength points +25, technique points +25, power points +20, running points +2, whereas the operating failure result is set to: agility points −20, muscular strength points −20, technique points −20, power points −20, running points −1, fielding points −1.

On the "Enchanted Island", a mini game focusing on the player's selections is prepared, and it is imagined that the character plays this game. In a mini game, for example, a game screen is displayed showing a game field having an entrance and an exit and comprising a plurality of vertical and horizontal grid squares, and the main character is caused to advance one square at a time from the entrance towards the exit. The player selects which of the surrounding 8 grid squares the character is to advance to from the grid square where it is currently positioned, thereby causing the character to move towards the exit. One or more landmines are hidden at randomly selected positions in these grid squares, and the number of landmines hidden in the eight squares surrounding the grid square currently occupied by the main character is displayed as a number on that grid square. Consequently, the player selects the next square to move to on the basis of this number, in order to avoid squares containing a landmine, and seeks to move the character to the target exit. If the player is successful, then success result plus/minus points are added, whereas if the player selects a grid square where a landmine is hidden, then a failure assumed and failure result plus/minus points are added.

Furthermore, each time that the character returns to his home country, the stamina index is essentially increased by +30 points. If, for example, the character caught a "disease" at the "Southern front", then it is increased by +25, and respective points increases are set similarly for other situations.

The ability value integrating means 30 (also referred to as ability value calculating means) executes addition processing with respect to the current ability values and stamina index, by reading out the prescribed plus/minus points and stamina index stored in the plus/minus points table of the ROM 141, in accordance with the front to which the player moves (is dispatched) in the success battle version game, the task accomplishment result at that front, and an event generated during development of the game, or the like, and it updates the corresponding data in the storage section of the RAM 142.

The week changing means 31 causes the game time set for the game to advance one week at a time, in essence, each time one task is undertaken.

The stamina index managing means 32 performs increase/decrease calculations for the stamina index set for the main character MC, and also monitors whether or not this value has fallen to a prescribed value, for instance, zero. For example, in the upper portion of the screen in FIG. 12, the stamina index is displayed by the "Stamina" symbol and in the form of a gauge consisting of a number of heart symbols, and the character's luck is shown by the "Luck" symbol and in the form of a gauge consisting of a number of star symbols.

The item acquiring means 33 gives the main character MC items which are useful in a competitive game, on the basis of whether an event is successful, if the character has survived as prescribed number of weeks, if the character has succeeded in accomplishing a specific task at a particular mission destination, and the like. The items may include, for example, a "lucky charm", "jewel", "letter", or a "medal" (upon surviving 100 weeks), or the like, and each bestows corresponding beneficial conditions on the main character MC (for instance, adding special points to the ability values in a competitive game, or acting to increase the success probability in a competitive game).

The event processing means 34 generate a type of game at a prescribed probability (randomly) during the undertaking of a task, and depending on the game result, the points are improved for special abilities of the character's abilities, or prescribed items are bestowed on the character by the item acquiring means 33. An event is generated randomly during the undertaking of a task and also during the main character's journey home. An event game occurring during the journey home may be, for example, four-out-of-one type game, where, as described hereinafter, the player is prompted to select from four characters, and the ability values are increased or decreased according to the game result.

The scene return processing means 35 implements processing for returning the main character to the home country each time a prescribed number of tasks (basically, four tasks) have been completed at a mission destination, in other words, after each four weeks. Specifically, it returns the game to the mission destination selection screen shown in FIG. 11.

Figure 25:
FIG. 25 is a diagram illustrating a game scene displayed on a monitor.

The time managing means 36 determines whether or not the number of weeks updated in the course of undertaking tasks has reached a prescribed value, and if it has reached this value, then it implements prescribed processing accordingly. In other words, in the present embodiment, 50 weeks and 200 weeks are set as times managed by the time managing means 36, and when 50 weeks has been reached, provided that the player selects to return to the home country, then the player is able to exit from the current game, and furthermore, if 200 weeks has been reached, then provided that the stamina index has not fallen to a prescribed value or below, for example, to zero, all tasks are terminated and the character is returned home (FIG. 25), in other words, the current game is automatically terminated.

The registering means 37 stores (registers) the current ability values of the main character MC, in association with the main character MC, in the RAM 142, when the game has been terminated by the time managing means 36 because 50 weeks has been cleared and the player has elected to exit, or because 200 weeks has been cleared. Furthermore, if the stamina index has fallen to or below a prescribed value, for example, zero, in the course of the game, then the registering means 37 attaches prescribed low ability values to the registered competitor, to represent a training failure, or alternatively, it applies prescribed ability values taking account of the training performance of the character up to the training failure (for example, the number of weeks cleared by the character), and stores these values in association with the corresponding main character MC in the RAM 142. Moreover, it may also have the function of deleting the whole registration of a main character which has failed training, from the RAM 142.

When the player has registered a new competitor to be trained (main character) by operating the operating section 4, in the selected mode of the "Success game", which is a further type of training game (or in the Success battle version game), the training initial value setting means 38 sets that competitor as a trainee character and also sets respective abilities for that competitor at the start of the game (right or left-handed, batting form, throwing technique, fielding position, subsidiary fielding position, pitch type, and the like), along with attributes (competitor name, shirt number, serial number, and the like), according to operations performed via prescribed buttons of the operating section 4 by the player (see FIG. 6 to FIG. 10). For example, screens for inputting individual data for registering a new competitor are displayed sequentially, as shown in FIG. 6 to FIG. 10 for the example of a pitcher, whereby the player is able to select or input data for the name (FIG. 6), fielding position (FIG. 7), preferred arm (FIG. 8), favourite baseball team (FIG. 9), and the like, the currently selected data being displayed in the top right of the screen. When all items have been set, a screen simulating a recruitment contract (FIG. 10) is displayed, and the set contents are registered in the RAM 142. Moreover, the training initial value setting means 38 may also be devised such that the other items are set automatically once the player has selected the competitor's name, for example.

Figure 26:
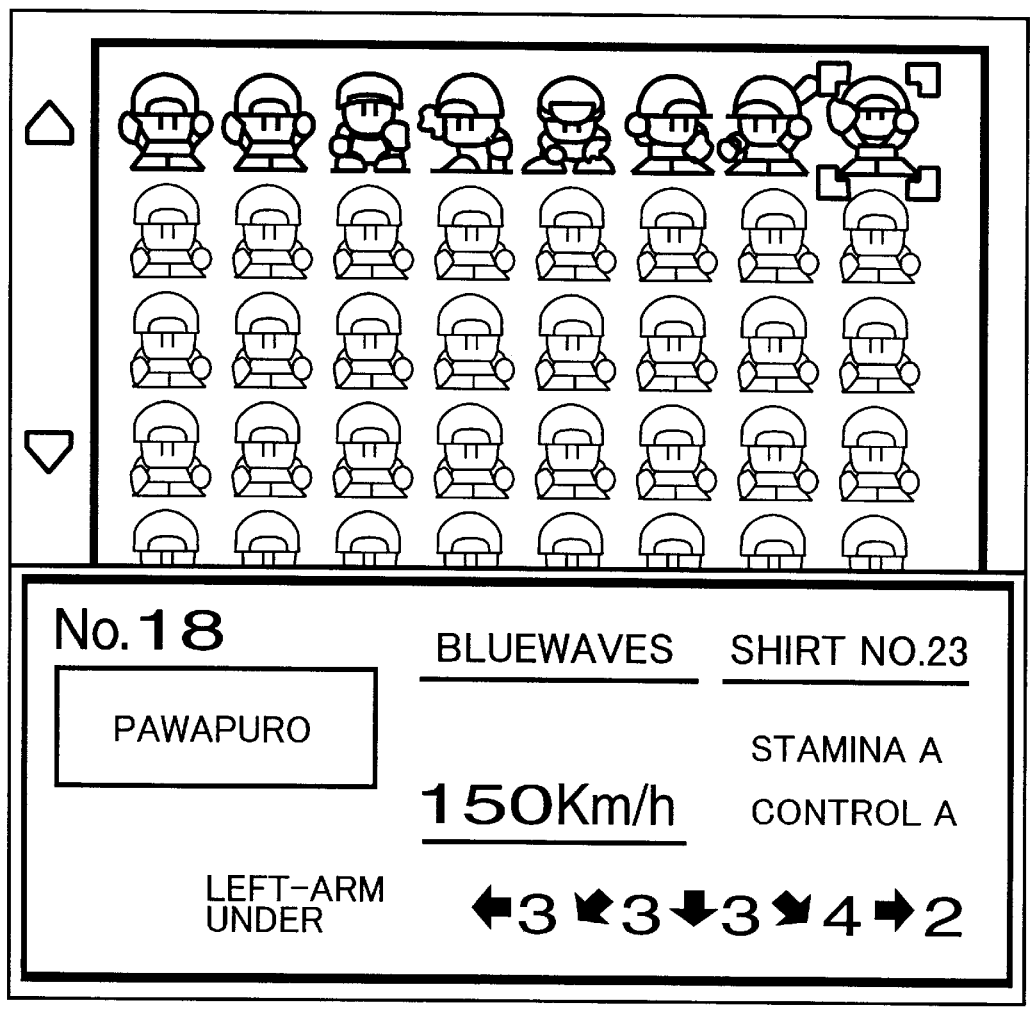
FIG. 26 is a diagram illustrating a game scene displayed on a monitor.
Figure 27:
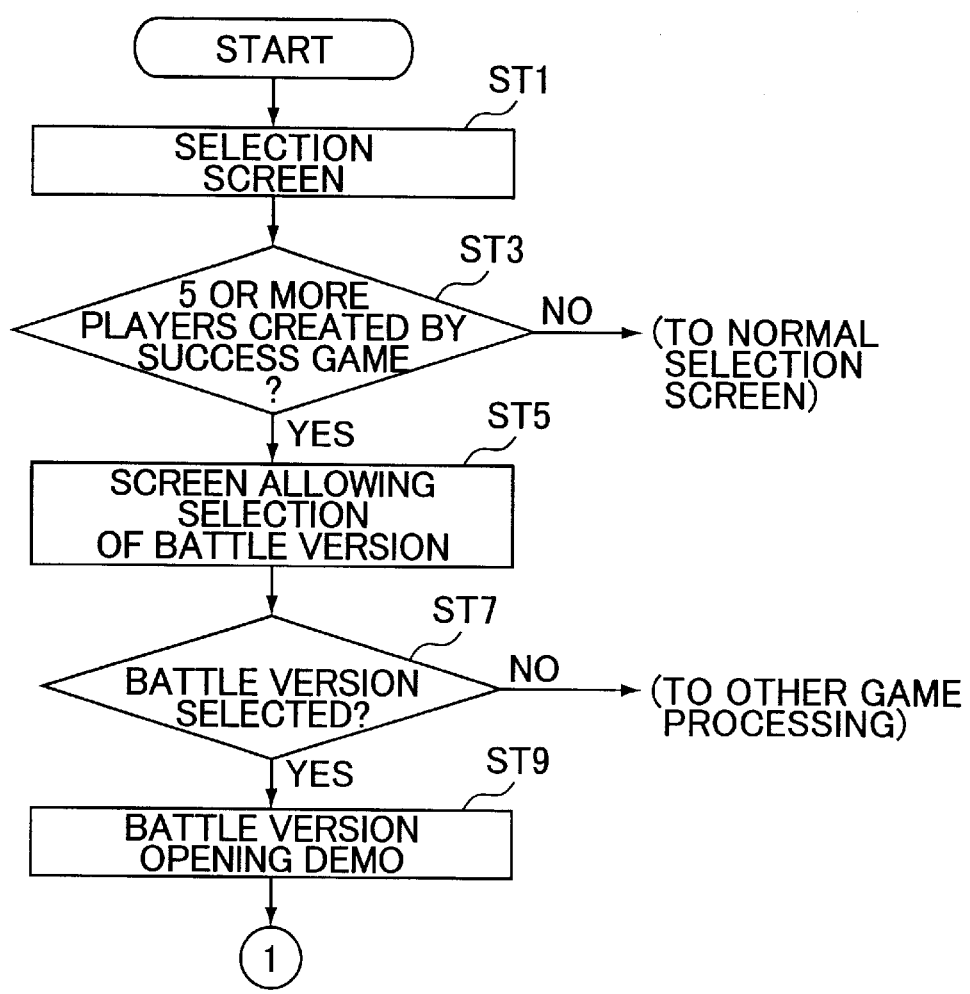
FIG. 27 is a diagram showing a flowchart for describing the operation of the present game.
Figure 28:
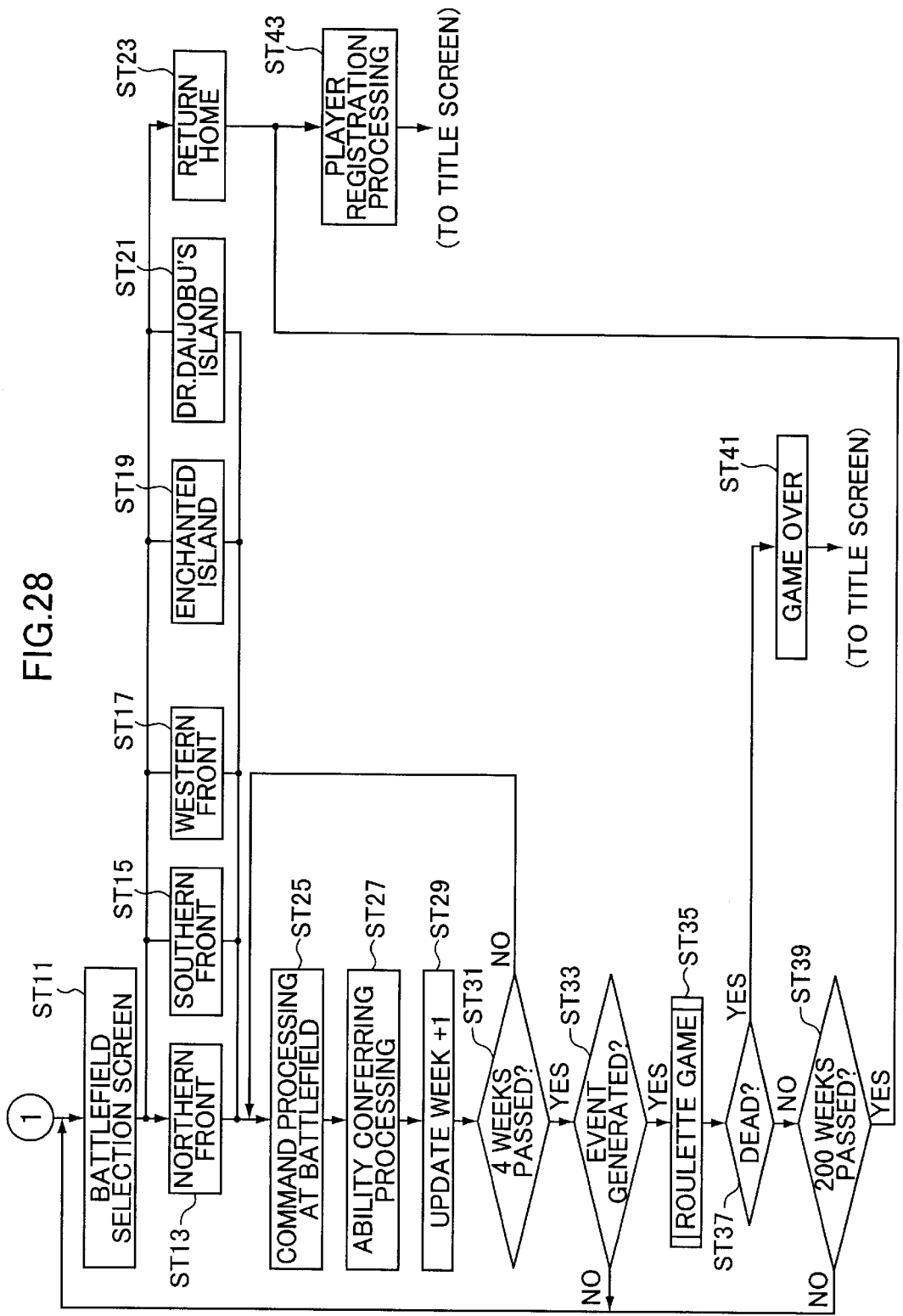
FIG. 28 is a diagram showing a flowchart for describing the operation of the present game.

Next, a game sequence for a success battle version game is described on the basis of the flowcharts in FIG. 27 and FIG. 28, and with reference to FIG. 3 to FIG. 26 showing game screens. These game screens are examples for describing a success battle version game, and the success battle version game may be constituted by means of other game screens to these.

Figure 4:
FIG. 4 is a diagram illustrating a game scene displayed on a monitor.
Figure 5:
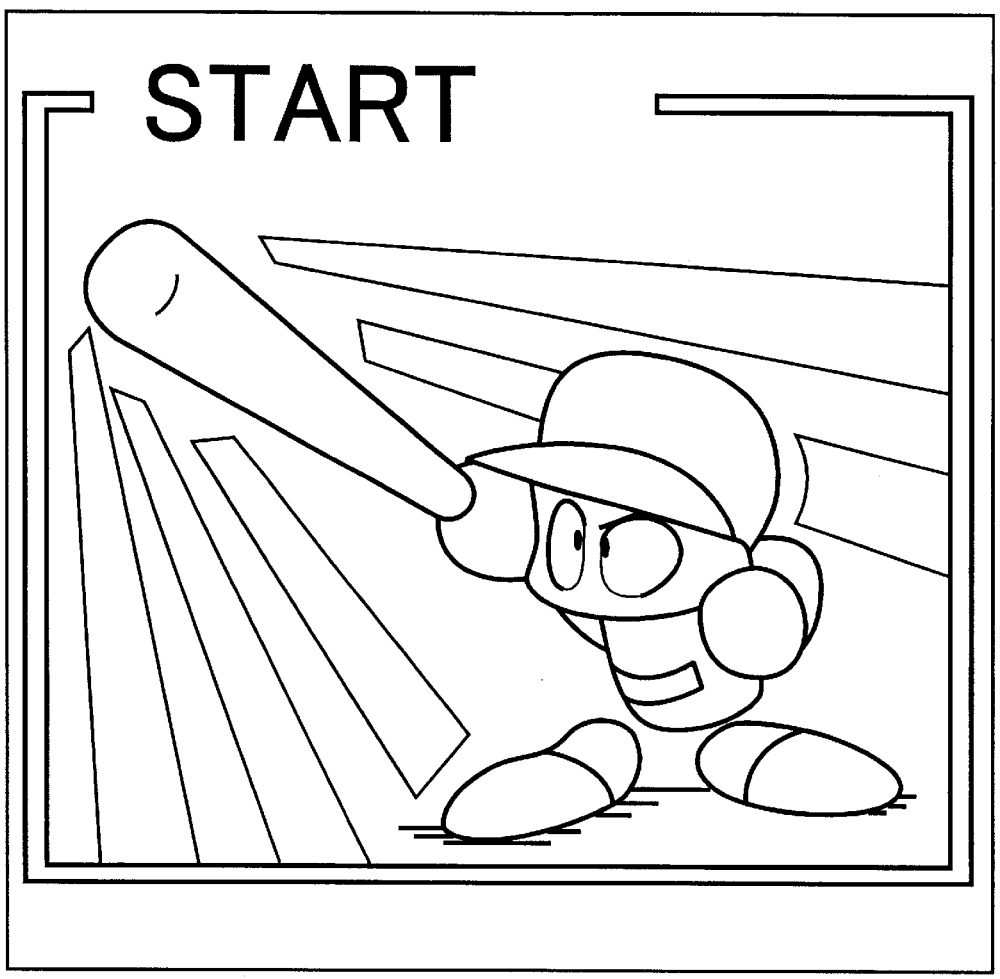
FIG. 5 is a diagram illustrating a game scene displayed on a monitor.
Figure 6:
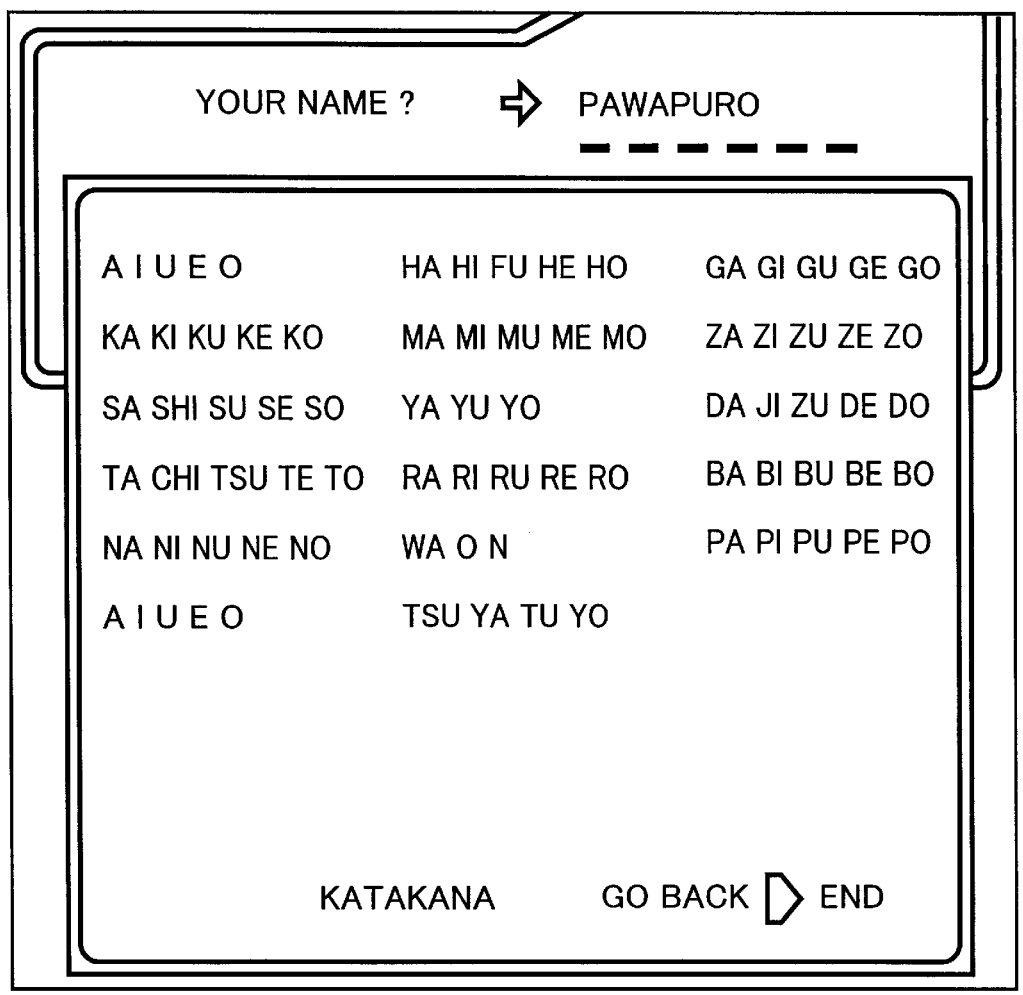
FIG. 6 is a diagram illustrating a game scene displayed on a monitor.
Figure 7:
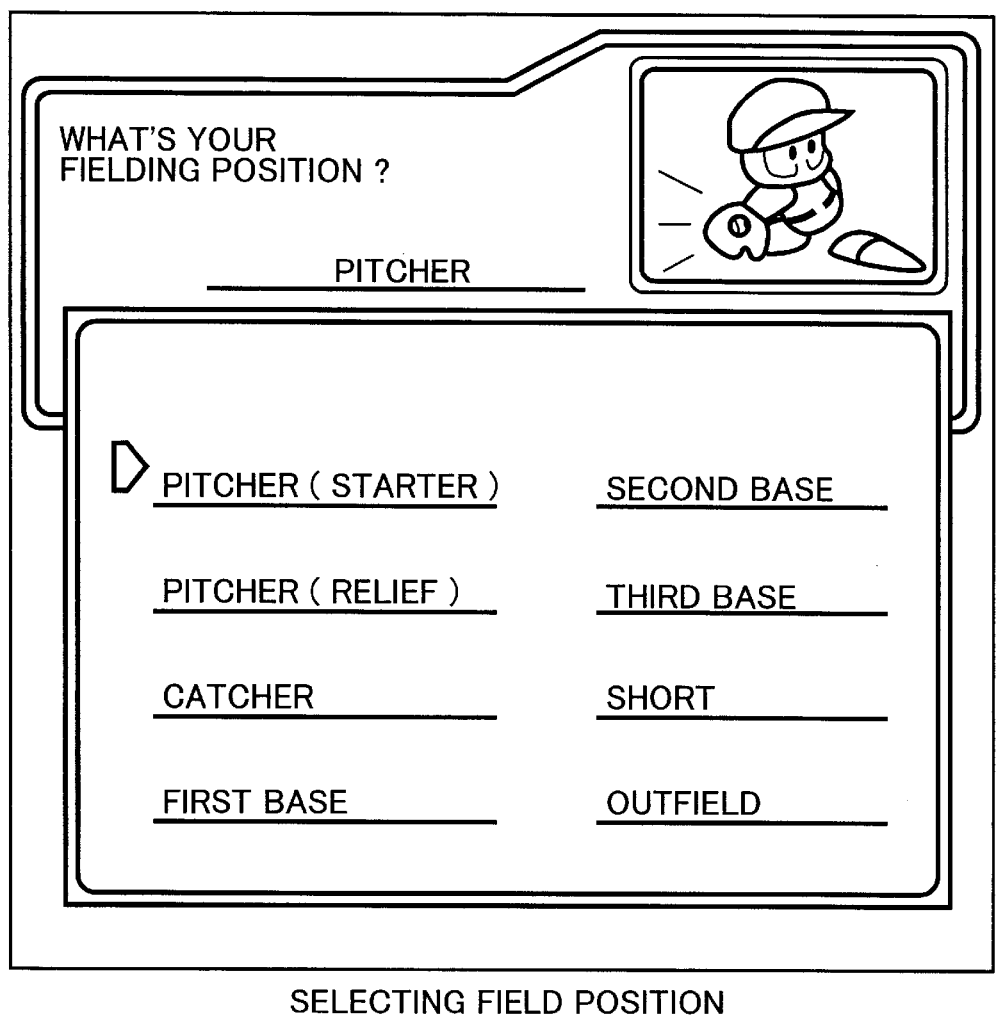
FIG. 7 is a diagram illustrating a game scene displayed on a monitor.
Figure 8:
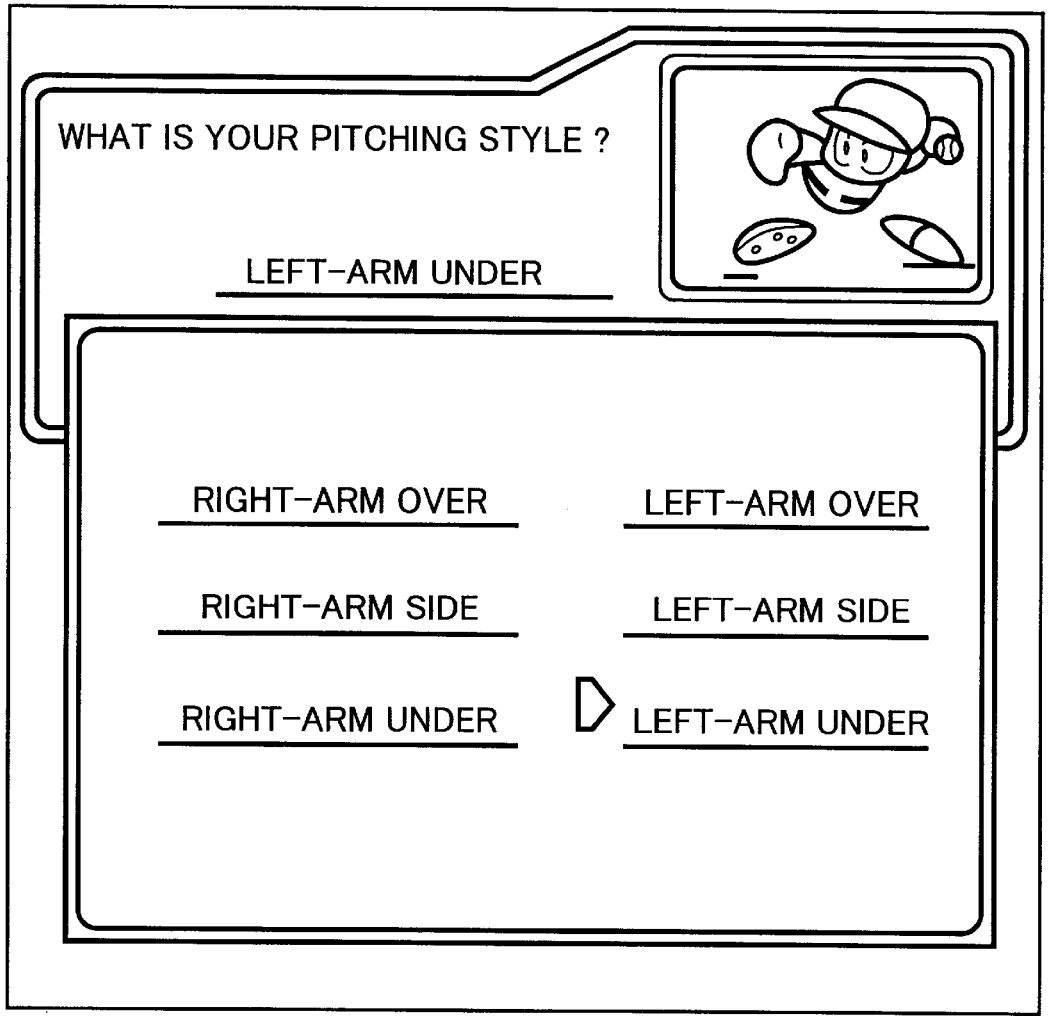
FIG. 8 is a diagram illustrating a game scene displayed on a monitor.
Figure 9:
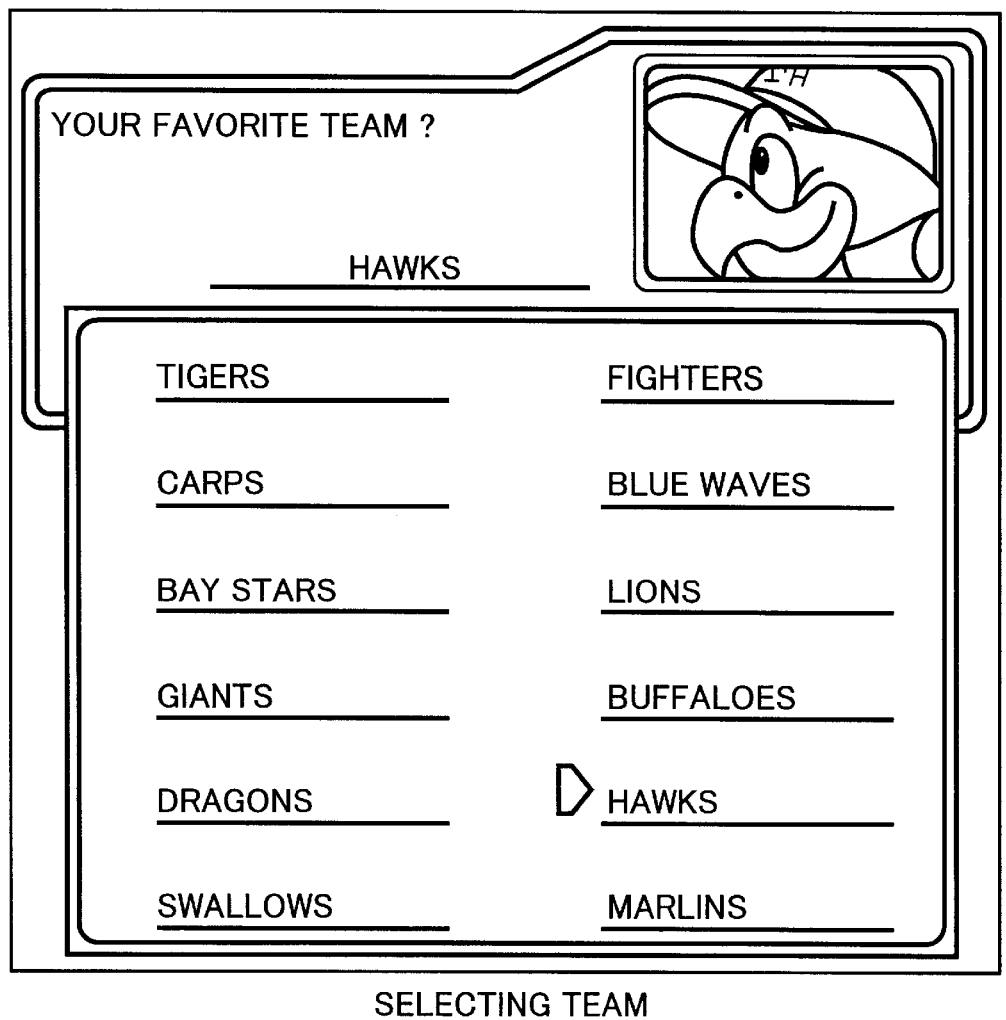
FIG. 9 is a diagram illustrating a game scene displayed on a monitor.
Figure 10:
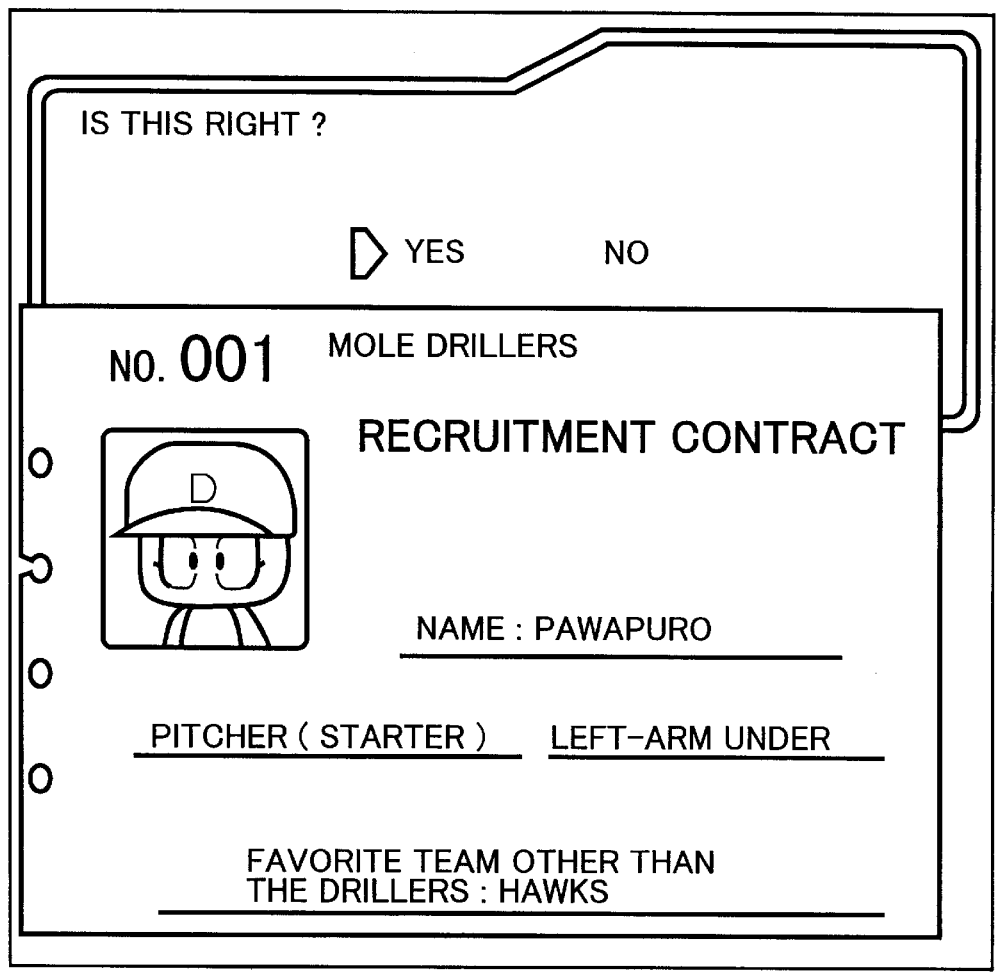
FIG. 10 is a diagram illustrating a game scene displayed on a monitor.

Firstly, if "Special" is selected from the selection screen forming the initial screen shown in FIG. 3 (step ST1), it is judged whether or not the number of registered competitor characters forming trainees in the success game is equal to or exceeds a prescribed number, if the competitive game is a baseball game, then five characters or more (step ST3), and if the prescribed number has not been reached, then a normal selection screen, for instance, a mode selection screen which does not contain "Special" mode, is displayed, whereas if the prescribed number has been reached, then the screen shown in FIG. 4 is displayed (step ST5). This screen contains the selectable options "Mini game", "Success Battle version" and "Score", and if the player selects an option other than "Success Battle version" via the operating section 4 (NO at step ST7), then the game transfers to "Mini game" or "Score" mode, whilst if "Success Battle version" is selected (YES at step ST7), then an opening demo screen for this Success Battle version game is displayed (see FIG. 5), along with music (step ST9).

Figure 11:
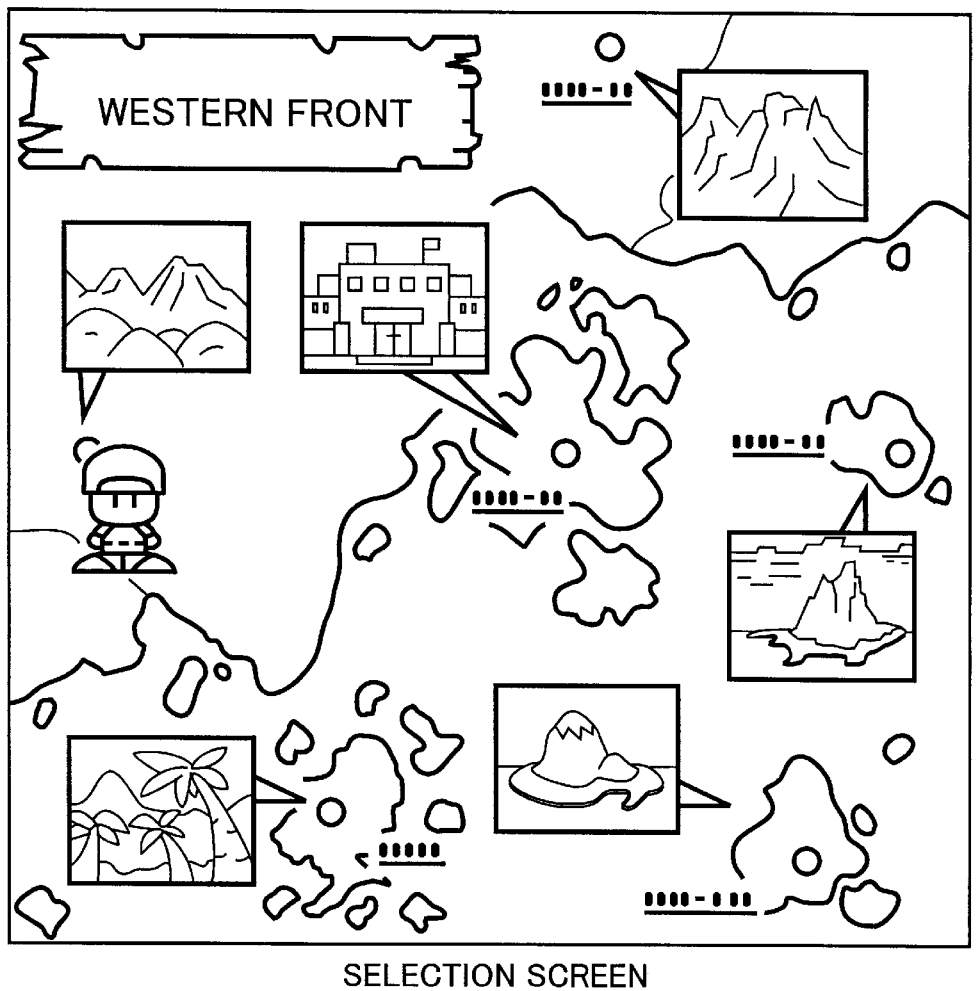
FIG. 11 is a diagram illustrating a game scene displayed on a monitor.
Figure 20:
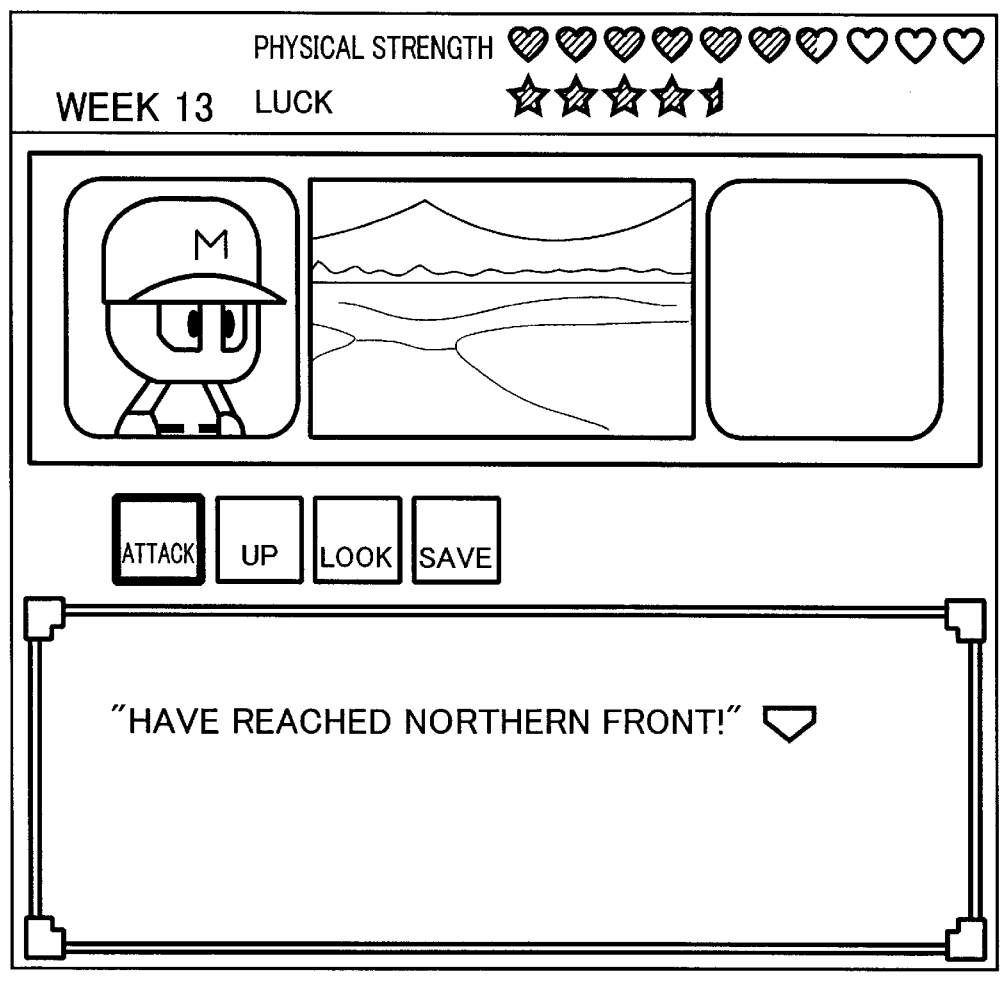
FIG. 20 is a diagram illustrating a game scene displayed on a monitor.
Figure 21:
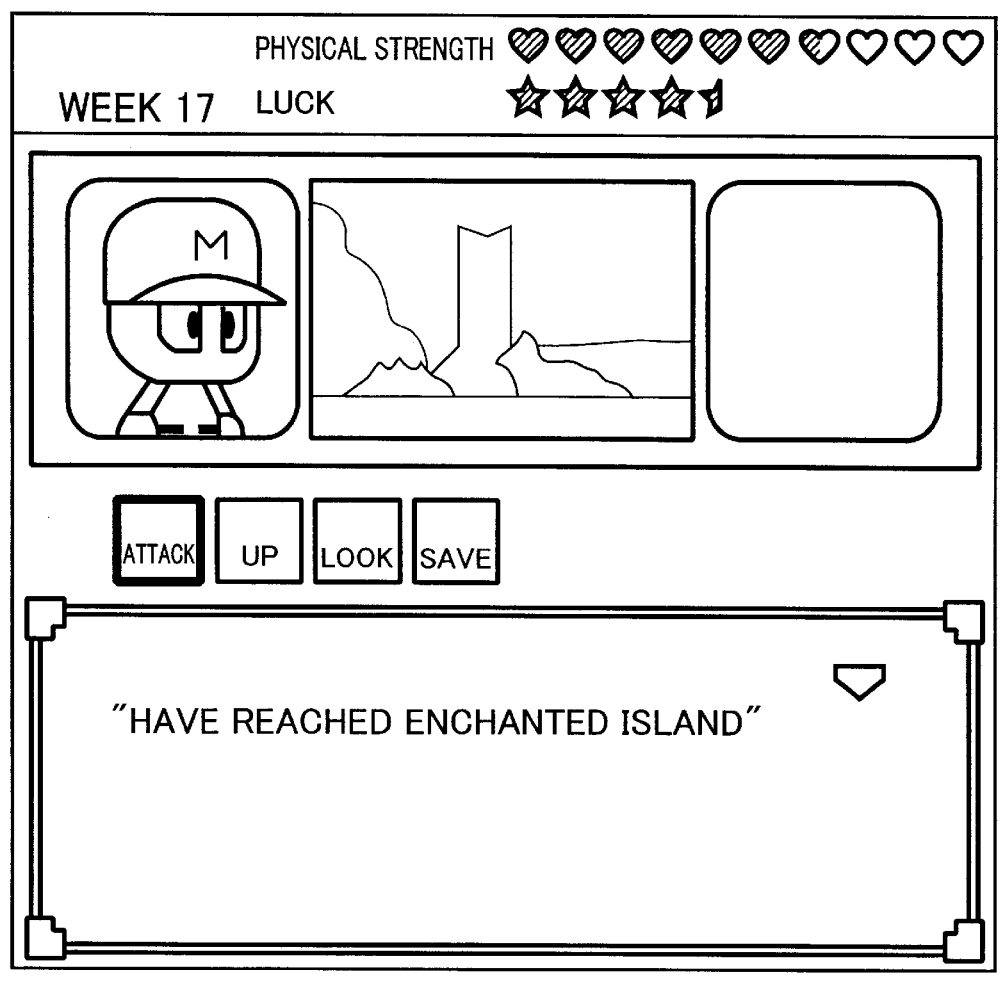
FIG. 21 is a diagram illustrating a game scene displayed on a monitor.
Figure 22:
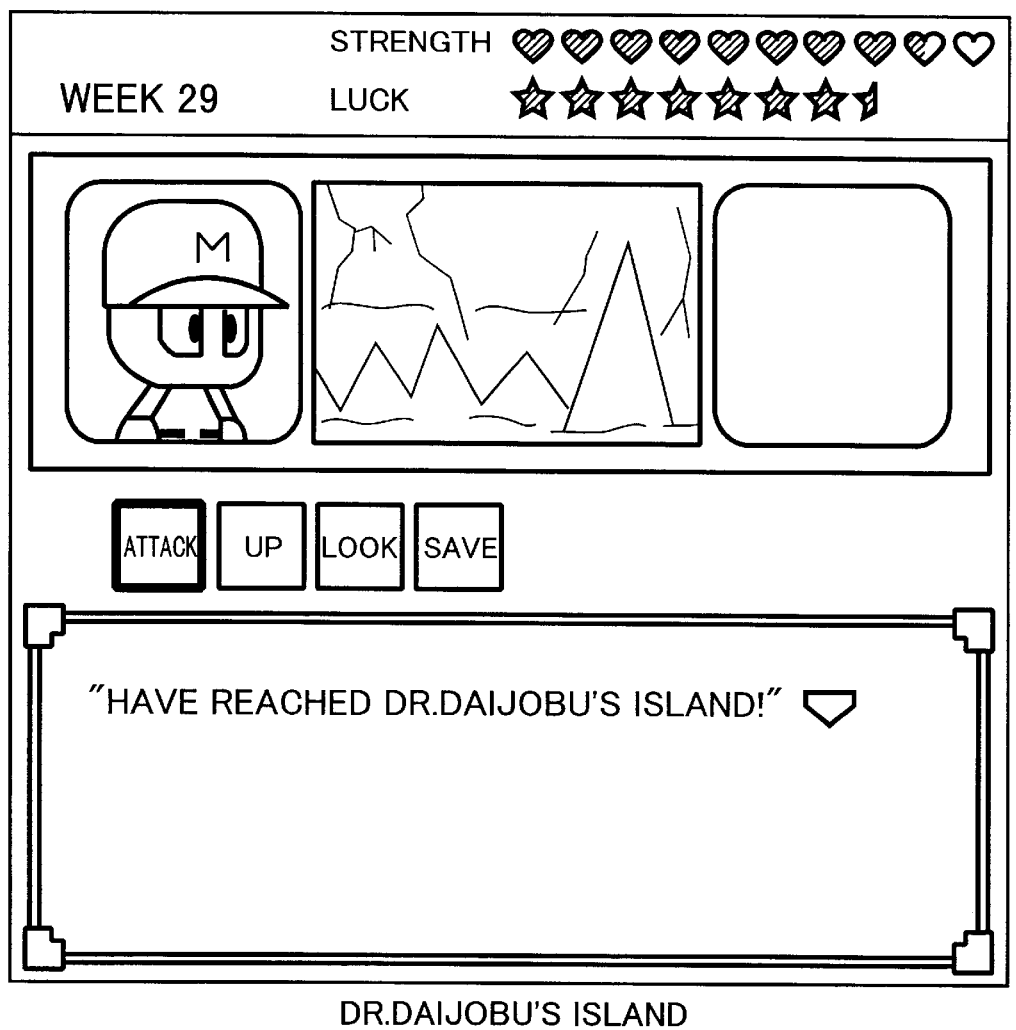
FIG. 22 is a diagram illustrating a game scene displayed on a monitor.
Figure 23:
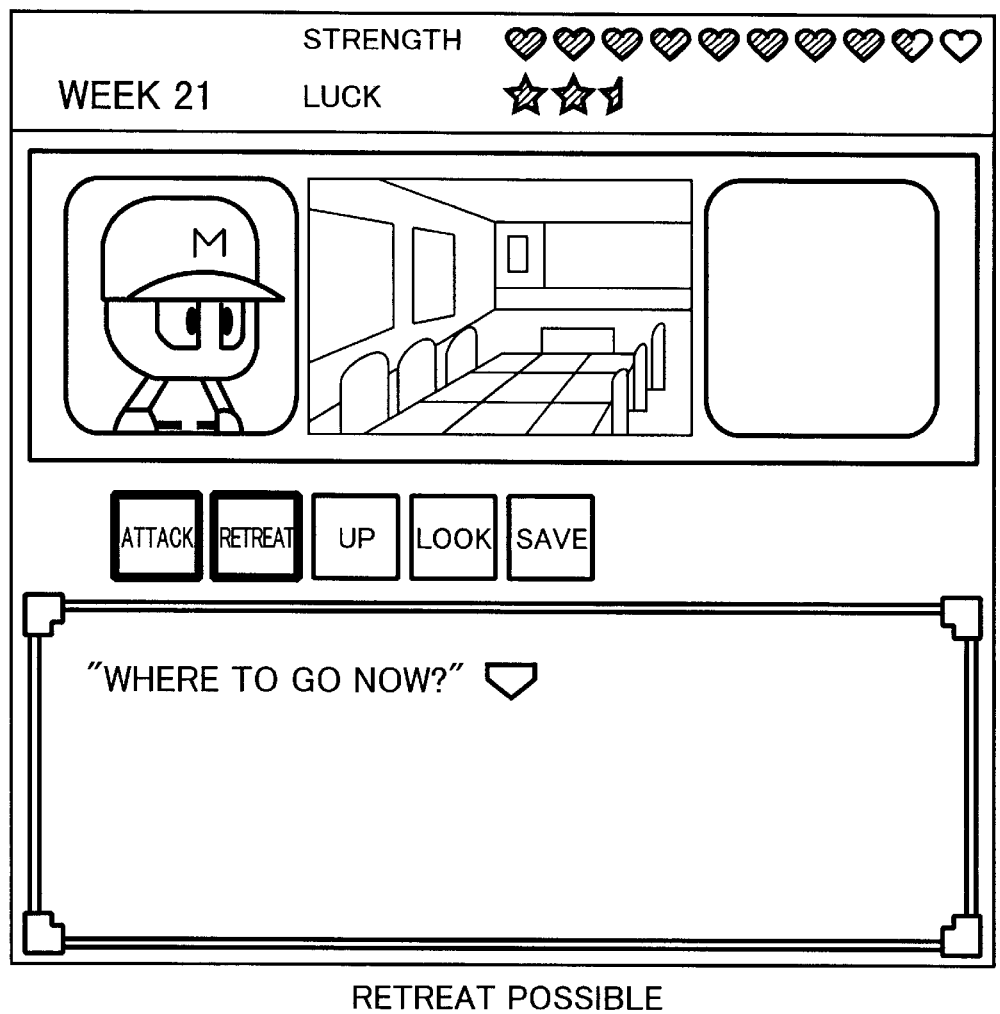
FIG. 23 is a diagram illustrating a game scene displayed on a monitor.
Figure 24:
FIG. 24 is a diagram illustrating a game scene displayed on a monitor.

Thereupon, a scene selection screen as shown in FIG. 11 is displayed (step ST11). This screen shows a map on which all of the mission destinations can be observed, and it depicts the home country in the centre thereof and the mission destinations located about the periphery of the home country. Situated about the home country, there are depicted, on the left-hand side, the "Western front", on the upper side, the "Northern front", on the lower side, "the Southern front", on the right-hand side, the special destination, "Dr. Daijobu's Island", and below this, a further special destination, the "Enchanted Island", these destinations being illustrated against a background image. Each mission destination can be selected successively, by moving the cursor in the up/down and left/right directions on the screen, by operating the cross-shaped button 6; FIG. 11 depicts a state where the "Western front" (indicated by text in the top left of the screen) has been specified. If this state is confirmed by pressing the first button 7, then the "Western front" is selected (step ST17). If selection of the "Northern front" is confirmed, then the procedure moves to step ST13 (FIG. 20). If the selection of "Southern front" is confirmed, then the procedure moves to step ST15 (FIG. 19), if the selection of "Dr. Daijobu's Island" is confirmed, then the procedure moves to step ST19 (FIG. 21), and if the selection of "Enchanted Island" is confirmed, then the procedure moves to step ST21 (FIG. 22). As shown above, scene images are displayed in accordance with the respective mission destinations.

Moreover, if the time managing means 36 determines that the game time has exceeded 50 weeks, then if the character is in the home country (map display status as in FIG. 11), then a further "Return" icon is displayed on the screen, and if this is selected, then the procedure moves to step ST23. Furthermore, the "Enchanted Island" or "Dr. Daijobu's Island" can only be selected if the character has a history of completing a mission at least a prescribed number of times, in the present embodiment, at least once, at the "Western front", "Northern front" and "Southern front", and until such time, these destinations are not selectable and are skipped if selected by the cross-shaped button 6, or the like. Alternatively, it is also possible to generate these destinations in a random manner. Consequently, the history (number of missions) data for each mission destination as specified by the scene changing means 27 is managed and updated in the RAM 142, or alternatively, if the fact of having visited the aforementioned three fronts is a condition for selecting the special mission destinations, then history data for only one turn is managed in the RAM 142.

Figure 15:
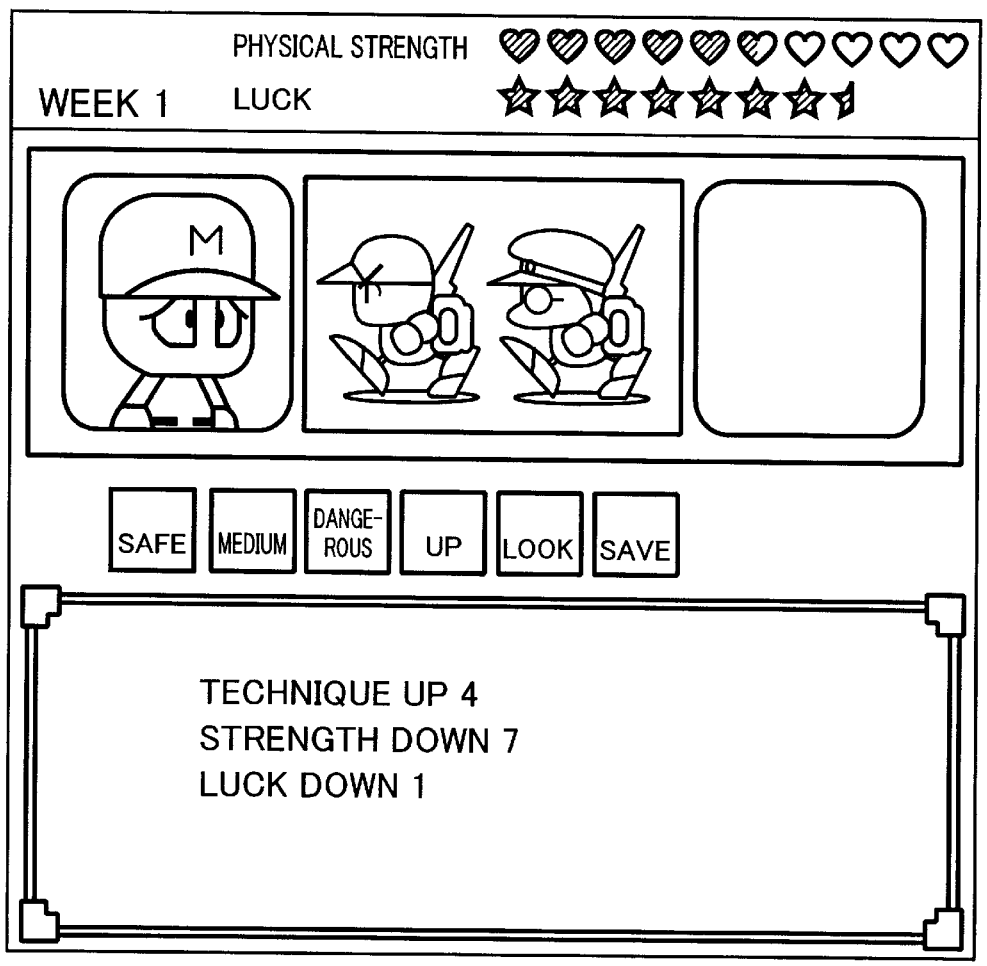
FIG. 15 is a diagram illustrating a game scene displayed on a monitor.
Figure 16:
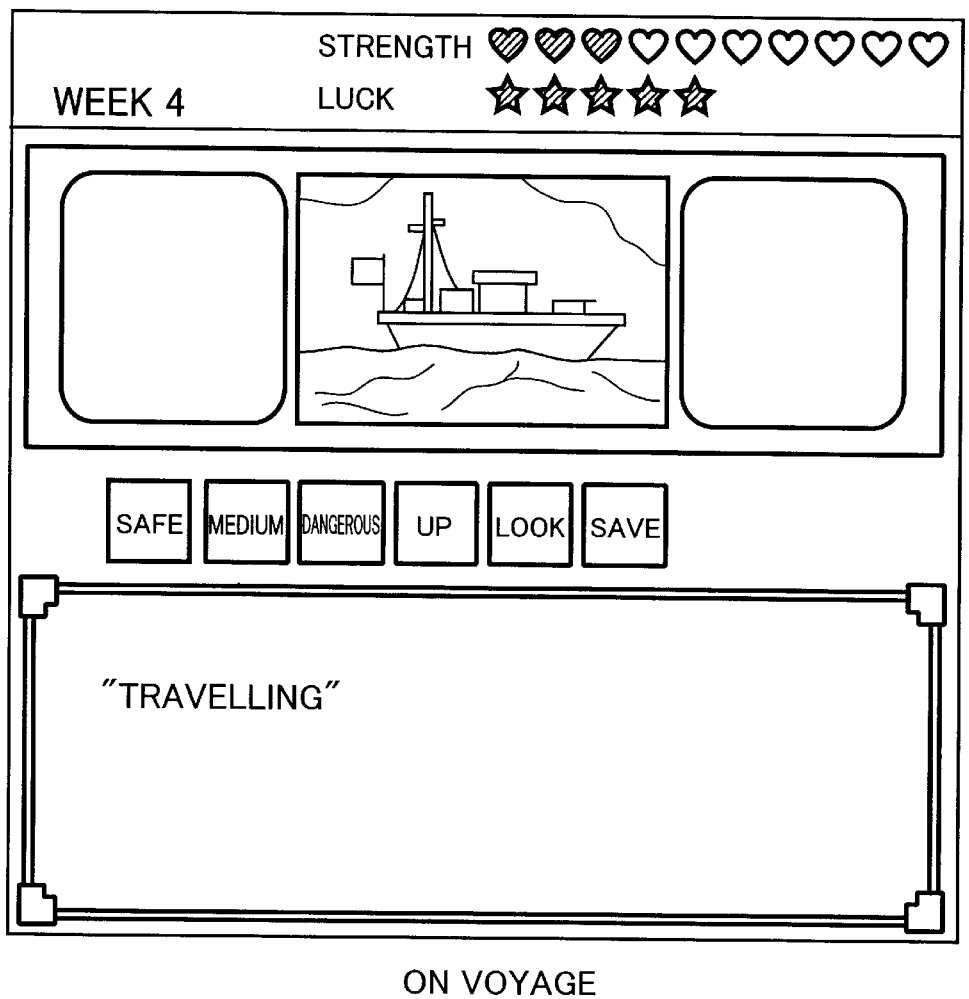
FIG. 16 is a diagram illustrating a game scene displayed on a monitor.
Figure 17:
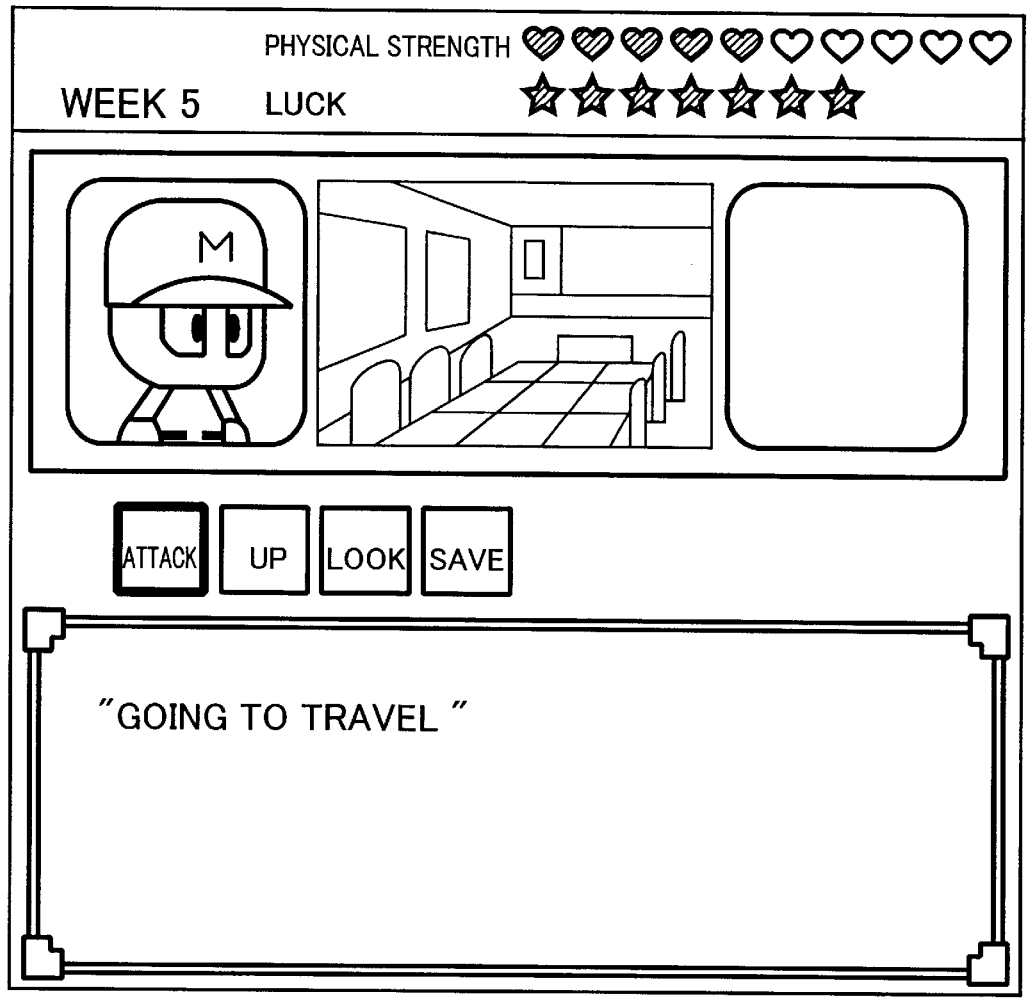
FIG. 17 is a diagram illustrating a game scene displayed on a monitor.
Figure 18:
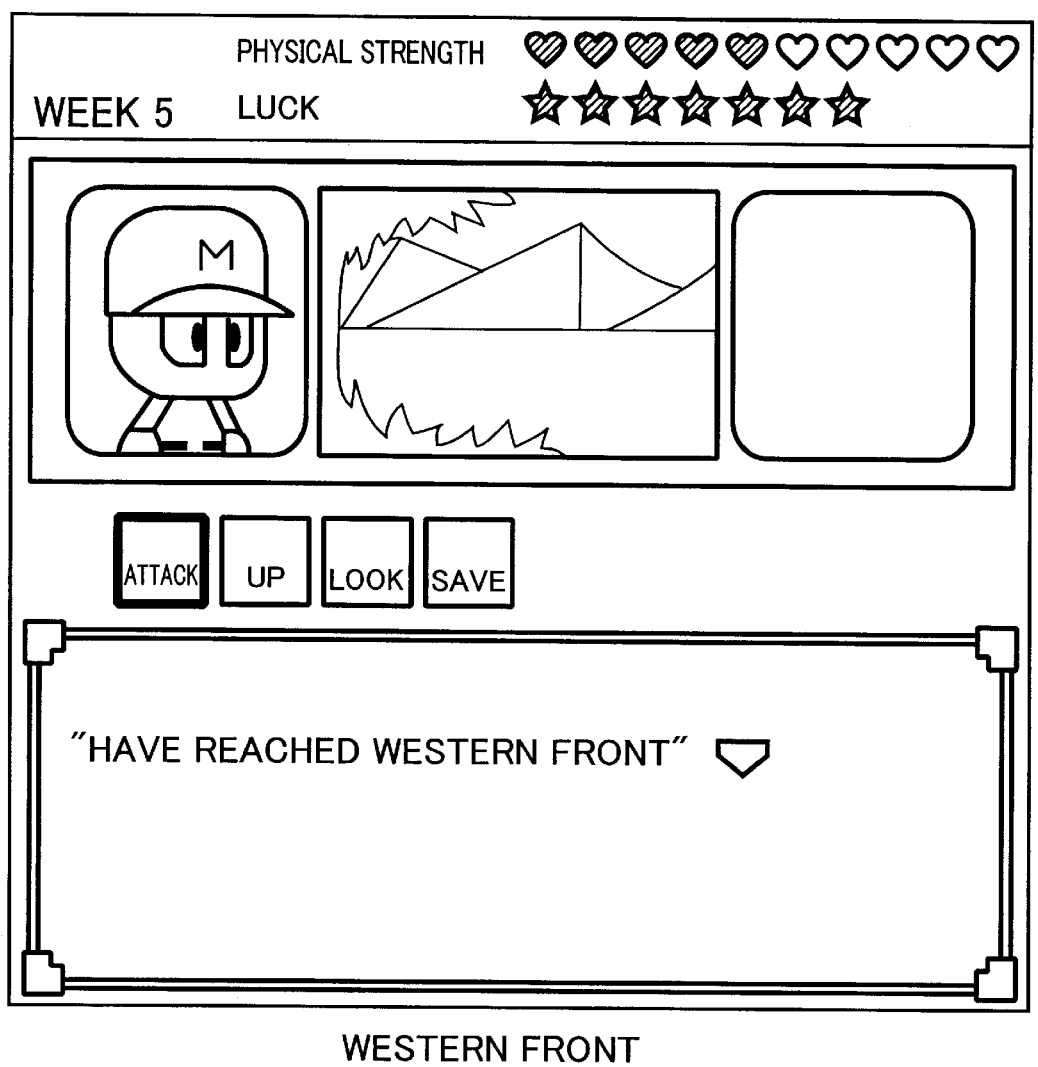
FIG. 18 is a diagram illustrating a game scene displayed on a monitor.
Figure 19:
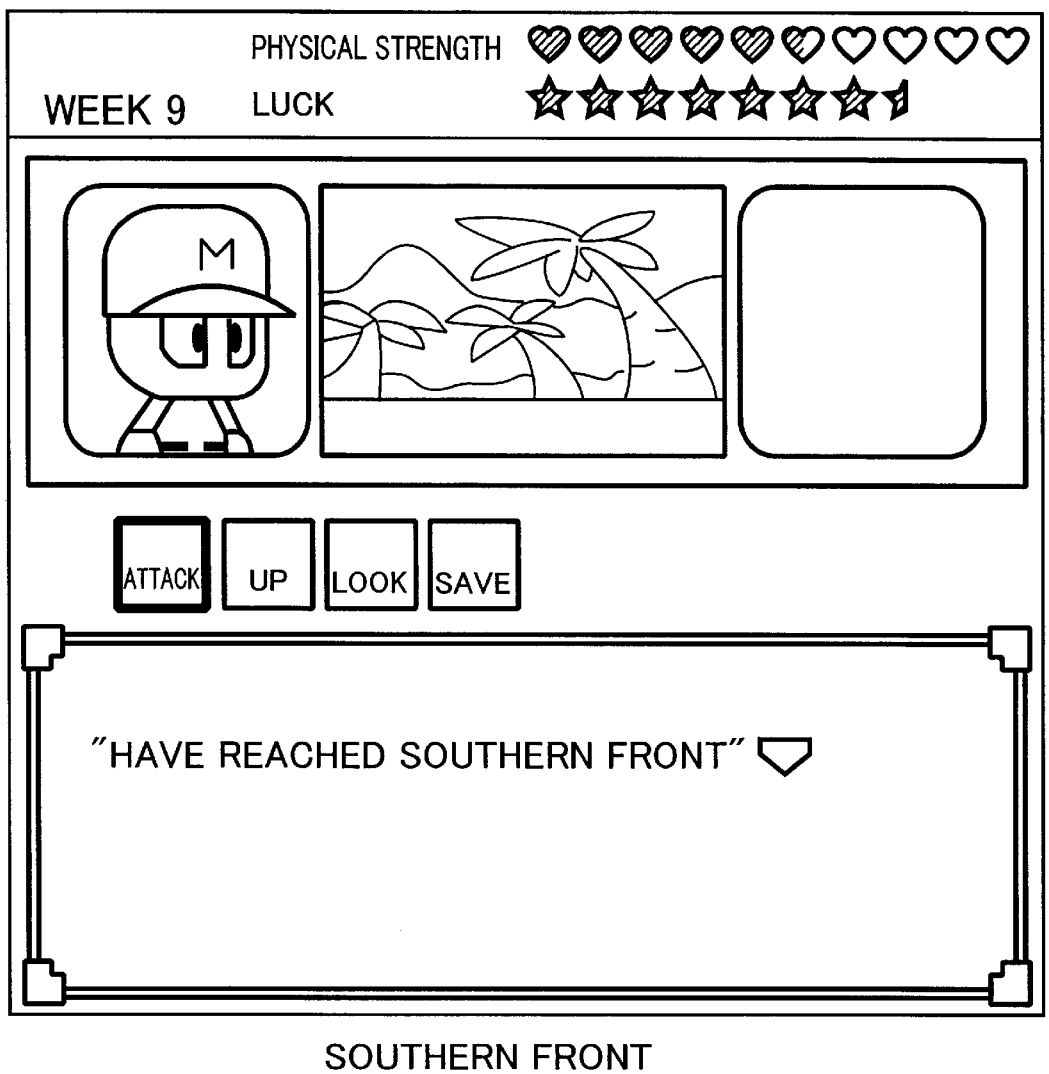
FIG. 19 is a diagram illustrating a game scene displayed on a monitor.

If the "Southern front" is selected (step ST15), then the procedure moves to step ST25, and as shown in FIG. 12, a background image is displayed in the central upper portion of the screen, a main character MC, and other characters, if necessary, are displayed on the right and left-hand sides, and prescribed speech and action (conversation) data is displayed in the lower half of the screen. Here, if "Attack" is selected and confirmed using the cross-shaped button 6 and the first button 7, then as illustrated in FIG. 13, danger level selection icons are displayed additionally, and when this selected has been completed, a prescribed task is selected randomly from the tasks previously prepared for the selected danger level, and this task is automatically executed according to a prescribed success probability (see FIG. 14). If the task is successful, then prescribed plus/minus points corresponding to the success are added to the corresponding previous ability values, and if the task is a failure, then prescribed plus/minus points corresponding to the failure are subtracted from the corresponding previous ability values (step ST27). The plus/minus points are displayed on the screen, as shown in FIG. 15. Next, the week changing means 31 increments the time by one week (step ST29), and it is determined whether or not four weeks have passed that the same mission destination (step ST31). If four weeks have not been completed, then the routine returns to step ST25, a further task is selected randomly, and processing for undertaking that task is executed. If four weeks have been completed, then the routine proceeds to processing for returning the character to the home country (see FIG. 16). In this return processing, the procedure returns directly to step ST11 (NO at step ST33), or if an event generated randomly during the return home occurs (YES at step ST33), then participation processing (step ST35) for a roulette game forming one mode of multiple-outcome procedure is executed.

The participation processing for the roulette game involves, for instance, the name of four warships representing ships for returning to the home country being displayed in a list on the screen. When the player selects the number corresponding to a desired warship name from these names, by means of the cross-shaped button 6, a returning home screen (see FIG. 16) is displayed, and the event processing means 34 identifies one random number out of four numbers, by random number generation, and if the number selected by the cross-shaped button 6 matches the number obtained as a result of the random number generation, then that warship is considered to have sunk and the stamina index of the character is reduced by a prescribed value, whilst if the two number do not match, then the character is regarded as having returned home without sinking. The routine then proceeds to step ST35.

At step ST37, it is judged whether or not the stamina index has fallen to or below a prescribed value, for instance, zero, and if it is still 1 or above, then the procedure moves to step ST39, whereas if it is zero, then the character is regarded as having died and game over processing is executed (step ST41). At step ST39, if the elapsed game time is less than 200 weeks, then the procedure returns to step ST11, and when the next mission destination is selected, the character is caused to move via the screen in FIG. 17 to the selected destination. If 200 weeks have been reached, then the procedure moves to step ST43 and the screen shown in FIG. 26 is displayed as confirmation, whilst competitor registration processing is implemented.

On the other hand, if, at step ST23, the player selects to return home, then the procedure also moves to step ST43 and competitor registration processing is implemented. When the Success Battle version game is terminated by these steps ST41, 43, the screen shown in FIG. 4 (or FIG. 3) is displayed.

Next, a further mode, namely, "Success" mode is described.

Figure 29:
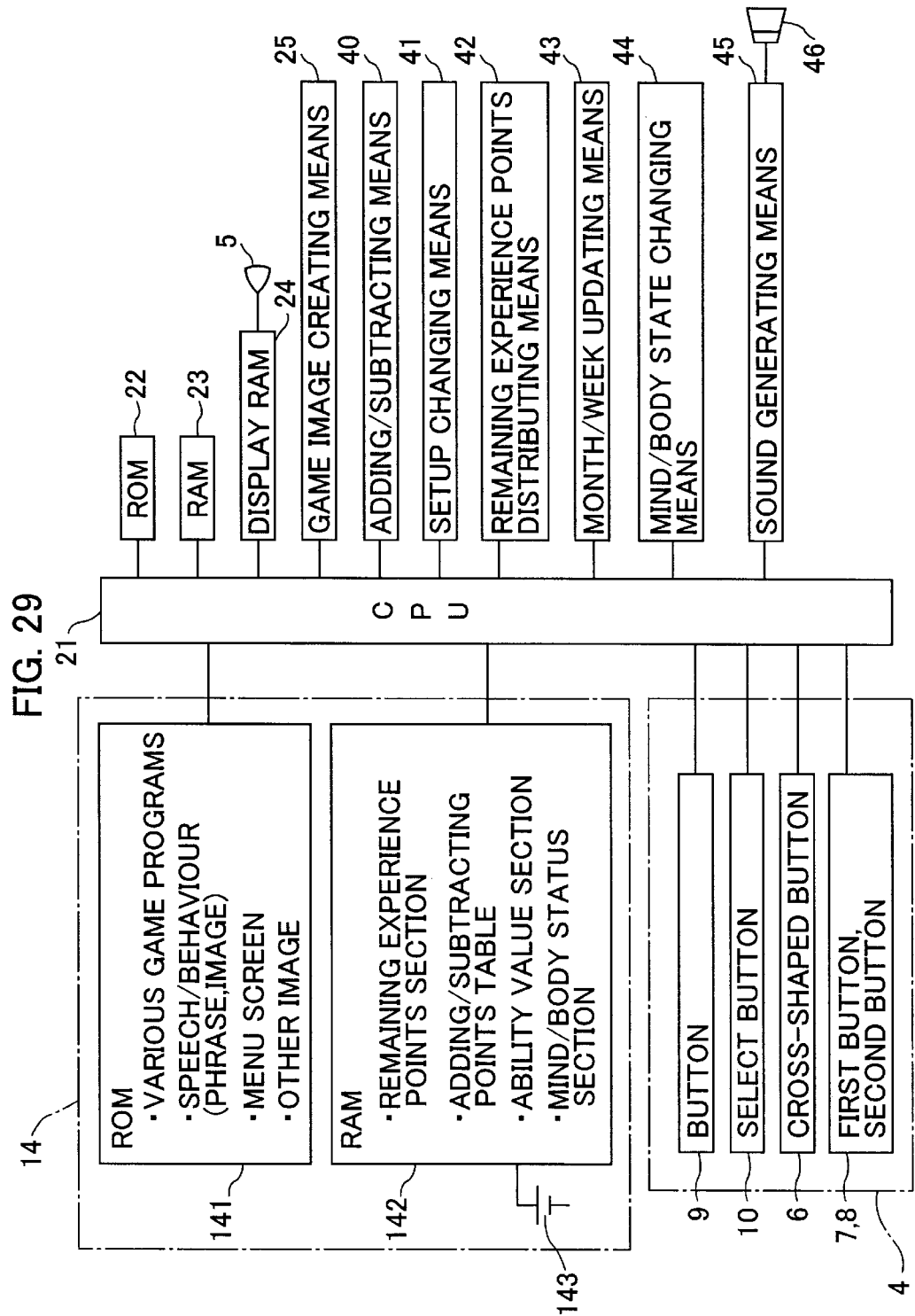
FIG. 29 is a diagram showing one example of an internal block diagram of the video game device relating to the present invention.

FIG. 29 shows one example of a block diagram for executing "Success" mode, centred on a CPU 21, which is a microcomputer central processing unit. In this "Success" mode, a new competitor (main character) can be trained. Therefore, if implementing another game stored in the ROM 141 of the game cartridge 14, it is necessary to provide various control means operating according to, for example, baseball rules in the case of a baseball match game (competitive game).

Furthermore, FIG. 30–FIG. 44 show one example of the progress of game screens, in order to describe the development of a "Success" game.

In FIG. 29, the ROM 141 inside the ROM cassette 14 has a memory map storing various game programs, main character speech and actions (phrases showing spoken words (see FIG. 35 to FIG. 38), and images showing the main character and associated character actions (see FIG. 39)), basic screens, and other images, such as background images. The RAM 142 has a memory map for storing and updating various data relating to the acquired points, plus/minus points, ability values, state of mind and body (physical condition, morale), and the like.

Figure 30:
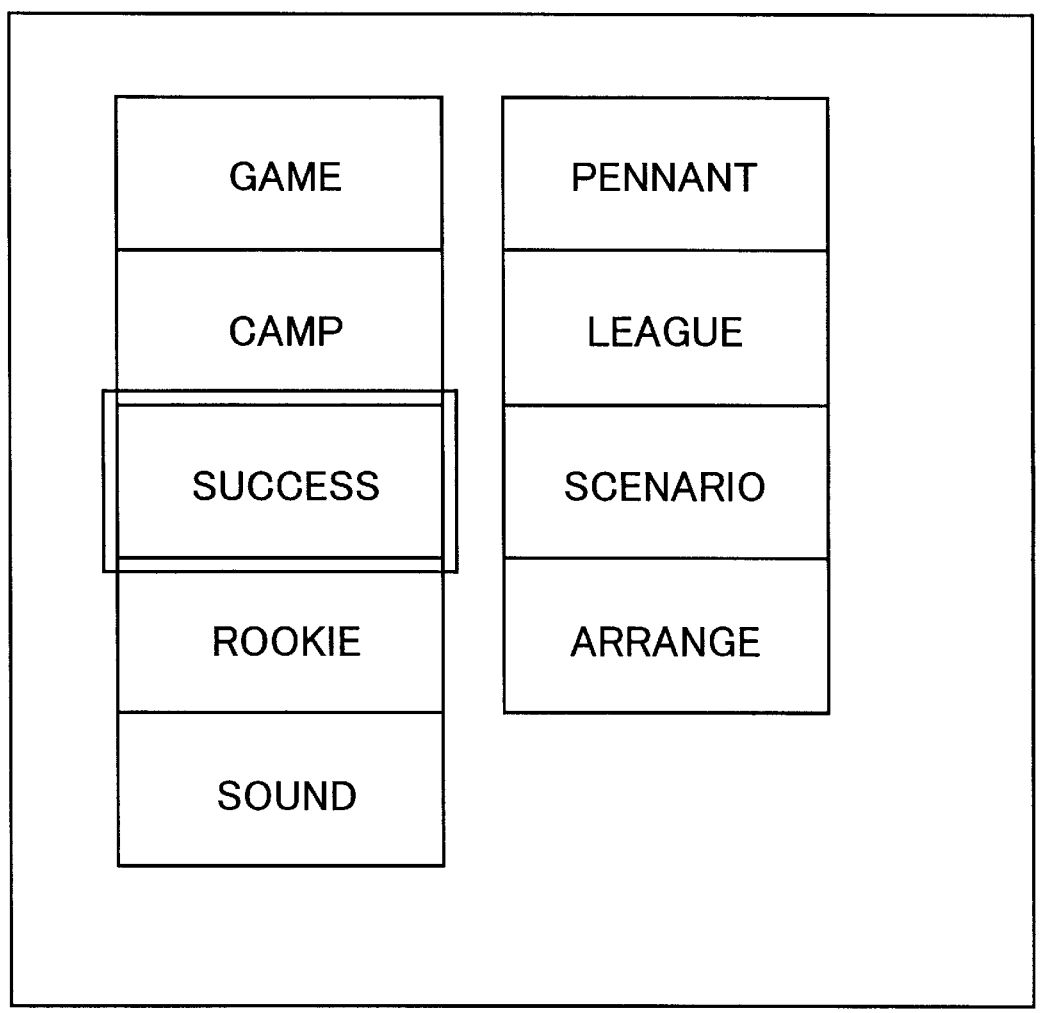
FIG. 30 is a diagram showing an initial screen.

When the game is started up, the screen shown in FIG. 30 is displayed, and by operating the cross-shaped button 6 to align the cursor with the "Success" icon, for example, (shown with double-line border in the diagram), and then pressing the first button 7 in this state, a "Success" game is started.

Figure 33:
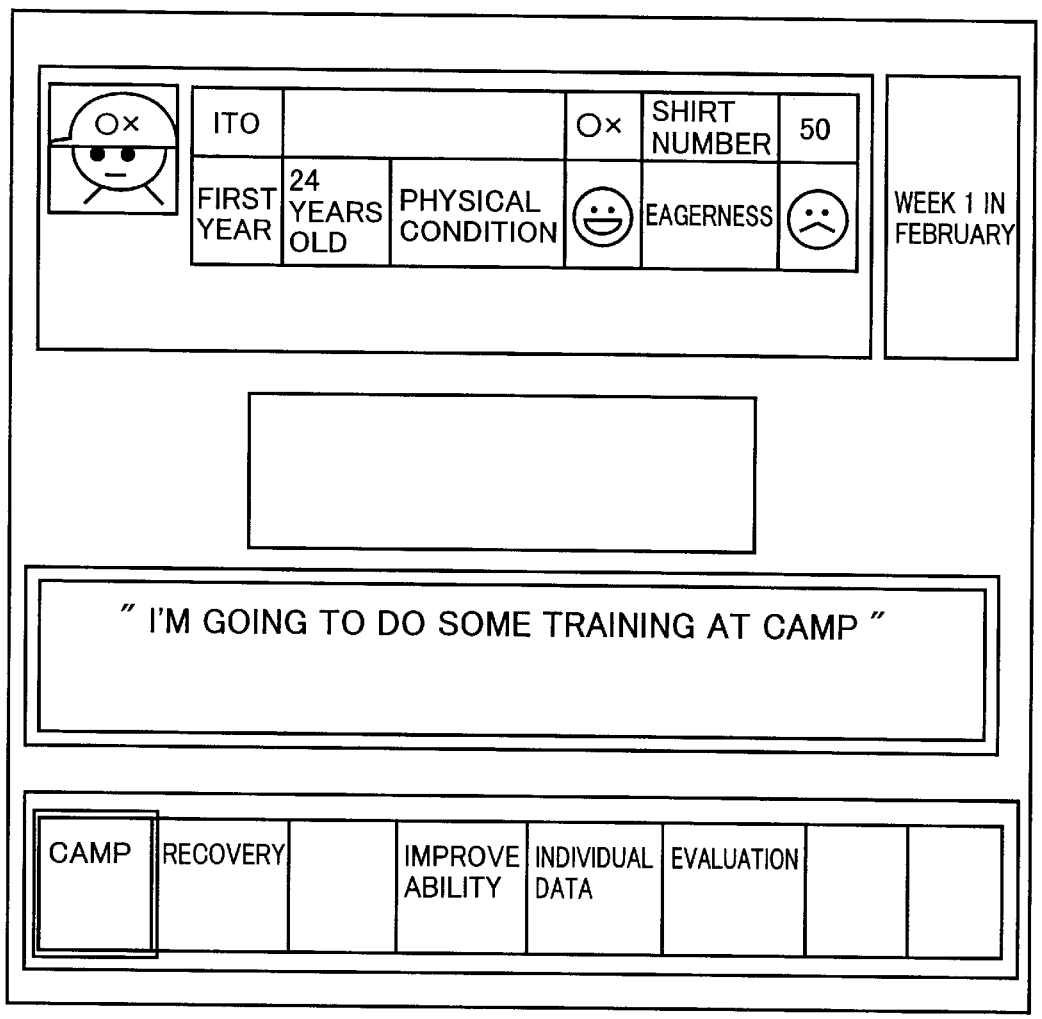
FIG. 33 is a diagram showing a speech and action command screen.

As shown in FIG. 33 and FIG. 34, "Camp" is selected, and the adding and subtracting means adds prescribed values to the "remaining experience points" (see FIG. 42) as the character practices, or alternatively, it subtracts values according to minus events. The probability changing means 41 sets the probability of the aforementioned adding and subtracting operations being performed, in a random manner, and it may set the probability by taking into account various changeable factors, such as the type of practice, the type of event, the "month and week" status, or the history of practice or events to that point. For example, the higher the respective factor, the better the situation and hence this acts to increase the probability, or conversely, it acts to reduce the probability (in the case of plus points). More specifically, it is possible to achieve this by increasing or reducing the number of matching numbers in the numbers of a specific range.

The remaining experience points distributing means 42 executes processing for distributing the "remaining experience points" to various types of "abilities". Types of "remaining experience points" include "muscular strength", "agility" and "technique", and these points values can be increased according to the type of practice in the "Camp" game, and according to the various other factors. The process of distributing "remaining experience points" to "abilities" is now described with reference to FIG. 42 and FIG. 44, for example. The figures in the tables shown in FIG. 42 and FIG. 43 are numbers indicates the "remaining experience points" required to increase an "ability" by one point.

To describe one example of increasing an ability, in FIG. 42, the remaining experience points are "muscular strength" 36 points, "agility" 65 points, and "technique" 44 points, and here, these are used to increase the abilities "batter power", "shoulder strength" and "fielding". The "batter power" value of 65 points is increase by two points to 67 points, the "shoulder strength" value of 8 points is increased by 1 point to 9 points, and the "fielding" value of 8 points is increased by 1 point to 9 points (see FIG. 44 in comparison to FIG. 42). 4 "Muscular strength" points are required for each "batter power" point, and 24 "muscular strength" points are required for each "shoulder power" point. Consequently, it falls from 36 points to 4 points (=36−4×2−24×1). In a similar manner, "agility" is reduced from 65 points to 50 points (=65−5×1−10×1), and "technique" is reduced from 44 points to 7 points (=44−5×1−32×1).

The month and week changing means 43 increases the game time by one week, each time the first button 7, and the like, is operated. The time changes in one week units, for example, in FIG. 33, the time is "Month 2, Week 1", in FIG. 34, it is "Month 2, Week 2", and in FIG. 35, it is "Month 2, Week 3". The number of years since recruitment is also displayed in the top part of the screen. Furthermore, the mind and body status changing means 16 represents the status of the "physical condition" and "morale" of the competitor by respective face symbols, as shown at the top right of FIG. 33. The "physical condition" status is reduced if practice in the "Camp" game (see lower line of FIG. 33) is excessive, and it is increased by "Recovery" (see lower line of FIG. 33) or hospitalisation, or the like. "Morale" status may be improved or reduced by "Camp" practice, events, "Recovery", and "Telephone" (see FIG. 36).

The sound generating means 45 generated speech and sound effects via the speaker 46.

Figure 31:
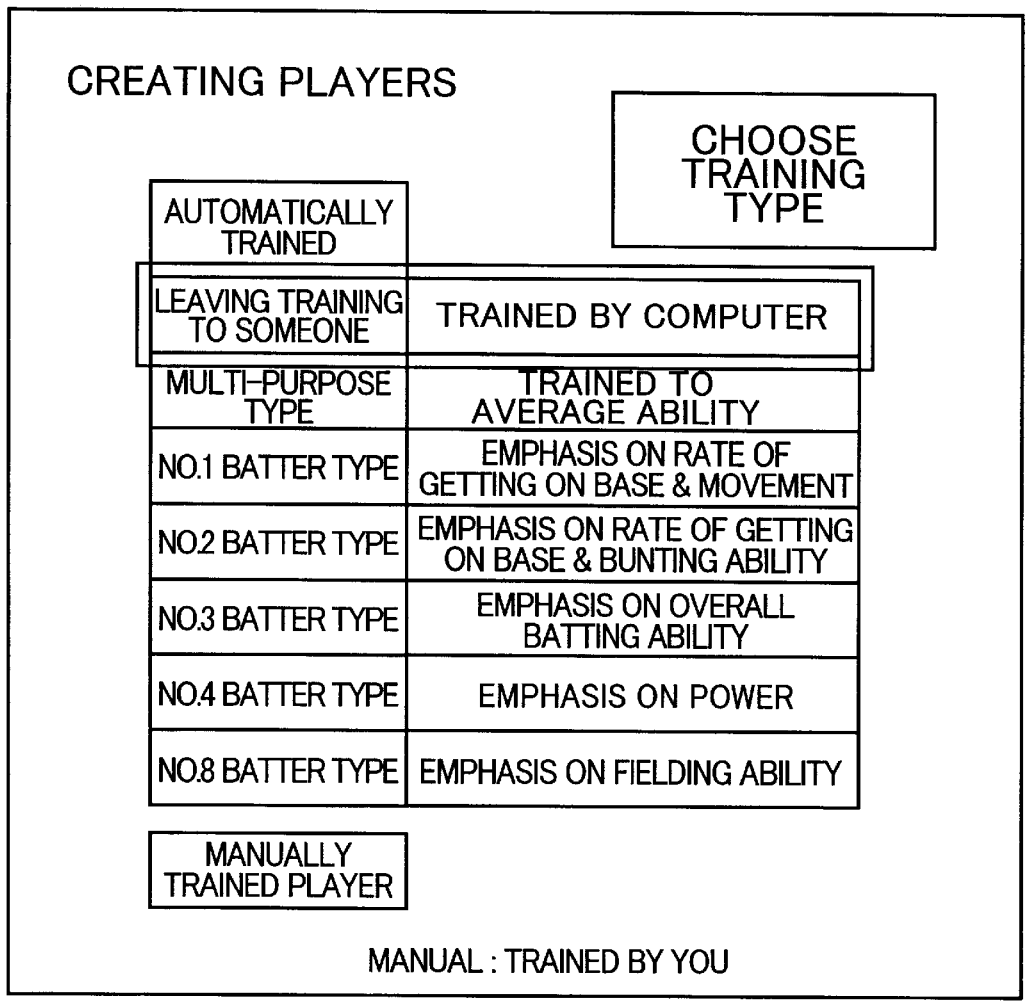
FIG. 31 is a diagram showing a screen for registering a new baseball player.

Next, a simple description is given with reference to FIG. 30–FIG. 45. FIG. 30 is an initial screen where a variety of games can be selected. In FIG. 30, when a "Success" game is selected, the screen in FIG. 31 is displayed. The screen in FIG. 31 is used to register a new baseball competitor, and divided broadly it is possible to register either "Automatic training" where the training of the competitor is undertaken by the computer or "Manually training", and within "Automatic training", it is possible to select "Utility type", "No.1 batter"–"No.4 batter", and "No.8 batter". FIG. 32 is the subsequent screen, where individual data is input for identifying the new competitor. This data comprises, for example, "name", "preferred arm", "fielding position", "form", and the like, the current description is displayed at the top right of the screen. At the bottom of the screen, data corresponding to the individual data indicated by the cursor position is displayed, in such a manner that specific data from amongst this data can be selected by means of the cursor.

FIG. 33 is the subsequent screen, which respectively displays the selectable options "Camp" (where cursor is set), "Recovery", "Upgrade ability", "Individual Data", "Evaluation", and the like. In FIG. 33, the cursor is placed over the "Camp" option. FIG. 34 is a screen displayed when this "Camp" option has been selected and confirmed, and it shows the options: "Bat", "Tee", "Sprint" (where cursor is positioned), "Run in", "Catch fly balls", "Real fielding", "Muscle training", "Return". According to these respective practice menus, the various values of the aforementioned "remaining experience points" are increased or reduced in accordance with probabilities generated by the probability changing means 41. For example, if "muscle training" is selected, then the "muscular strength" is increased, but the "technique" points are reduced. Furthermore, "Return" is used to return to the previous screen. Moreover, "Bat" differs from the other elements in that, depending on the abilities of the player, the "remaining experience points" are either increased or reduced, in accordance with probabilities generated by the probability generating means 41. In other words, essentially, a screen similar to that in FIG. 39 described below is displayed (batter and pitcher), and the player is able to perform batting practice for a prescribed ball. The player performs batting by moving the meet cursor MC (see FIG. 39, indicates region where bat will strike ball) vertically and transversely by means of the cross-shaped button 6 and hitting a ball pitched by a batting pitcher by means of the first button 7, and in this way the player is able to improve the "remaining experience points", in accordance with a probability from the probability changing means 41, or alternatively, these points may be reduced.

Figure 35:
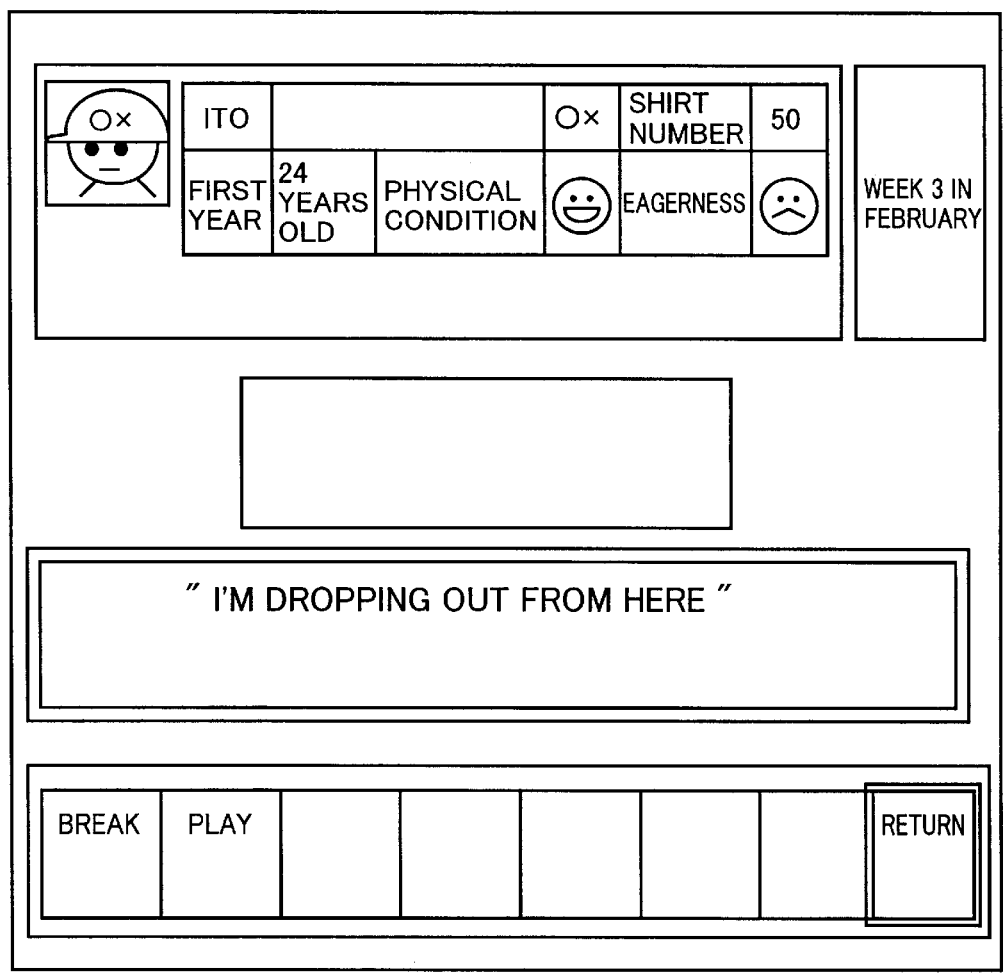
FIG. 35 is a diagram showing a screen where "Recovery" has been selected.
Figure 36:
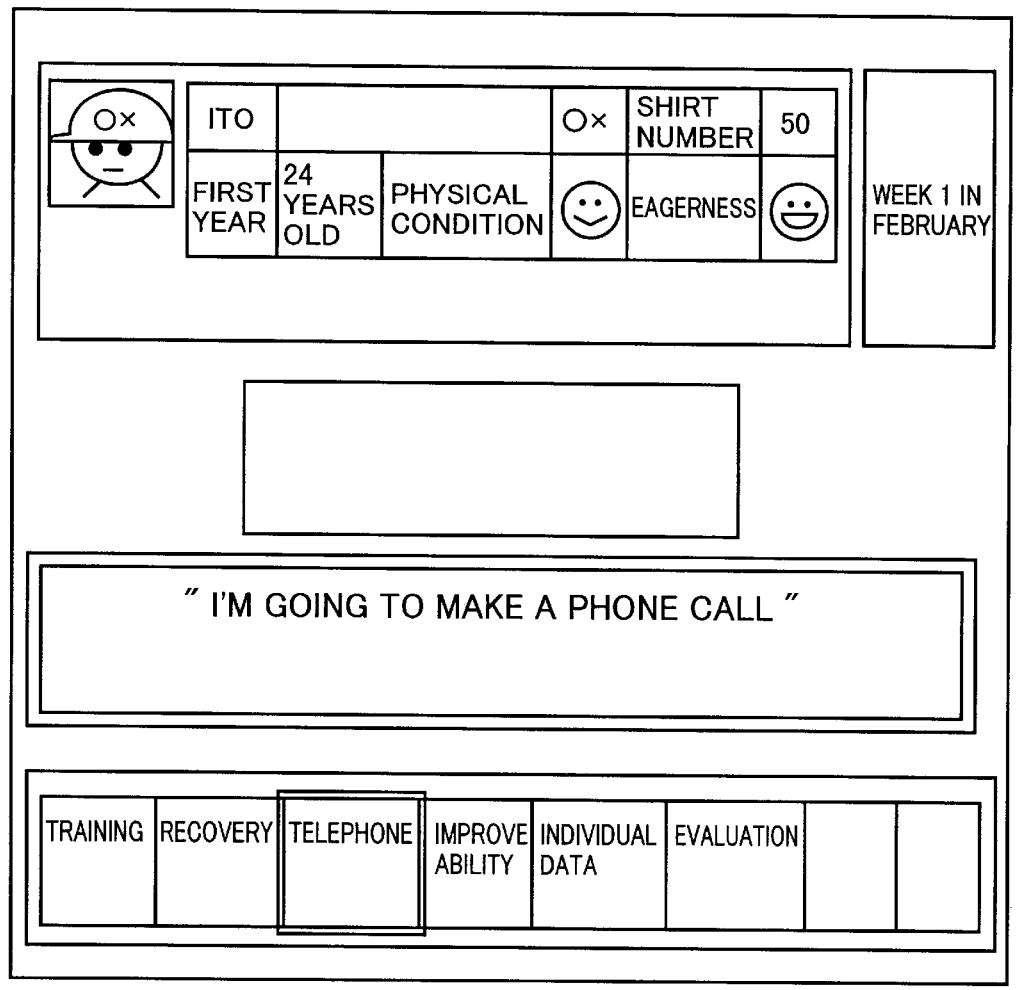
FIG. 36 is a diagram corresponding to FIG. 6, where a "Telephone" option can also be selected.

FIG. 35 is a screen displayed in a case where "Recovery" has been selected in FIG. 33, and it shows the options "Rest", "Play", "Return". FIG. 36 is a screen corresponding to FIG. 33, but it differs in that it includes the option "Telephone" which is displayed according to the player and various different conditions. Although not shown in the diagram, if the character has an injury due to a negative event and goes into hospital, then "Recovery" and "Telephone" are shown on this screen, and "Camp" is of course not displayed (cannot be selected). FIG. 37 is the next screen after "Telephone" has been selected in FIG. 36. The options for "Telephone" are "Coach", "Team mate", and "Home". Here, if the coach is telephoned, then the character has various conversations and essentially, the "remaining experience points" are improved, but other points are reduced. If the team mate is telephoned, then the manager's evaluation is improved. And if the character telephones home, then the "morale" is improved, but other points are reduced. Factors of this kind are controlled by the adding and subtracting means 40 in accordance with the changes in probability effected by the probability changing means 41.

Figure 38:
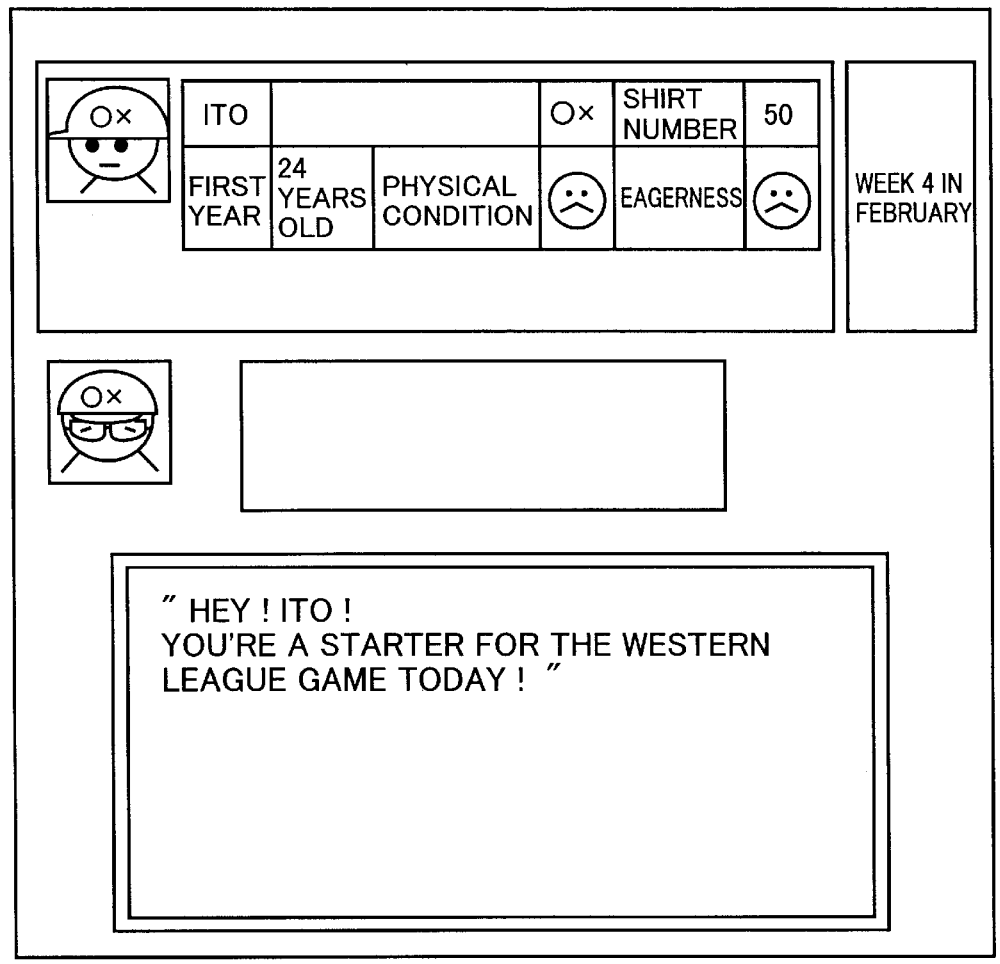
FIG. 38 is a diagram showing a screen of a conversation for transferring a competitor to a minor league trial.
Figure 39:
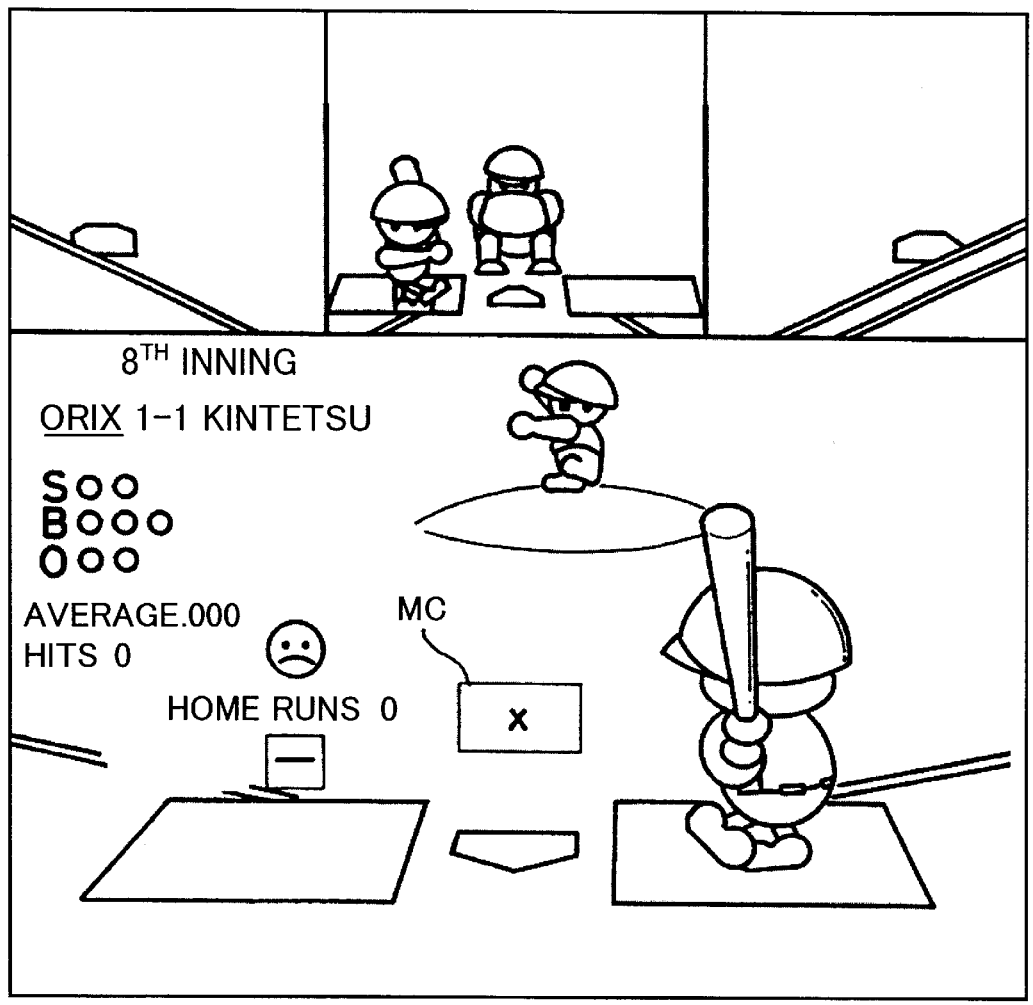
FIG. 39 is a diagram showing a state where a competitor appears in a minor league match as a batter.

FIG. 38 is a screen where the coach's evaluation has improved and a major league trial is granted to the character. FIG. 39 is the screen following to FIG. 38, where the character appears as a batter in a minor league match. Here, the greater the number of safety hits, the higher the evaluation of the coach and manager. FIG. 40 is a screen showing the results of the minor league trial, and the coach's and manager's evaluation are reduced by "strike outs" in particular, which lower the chances of passing the trial. These results are incorporated as a factor by the probability changing means 41 in such a manner that they influence the subsequent addition and subtraction of "remaining experience points".

Figure 41:
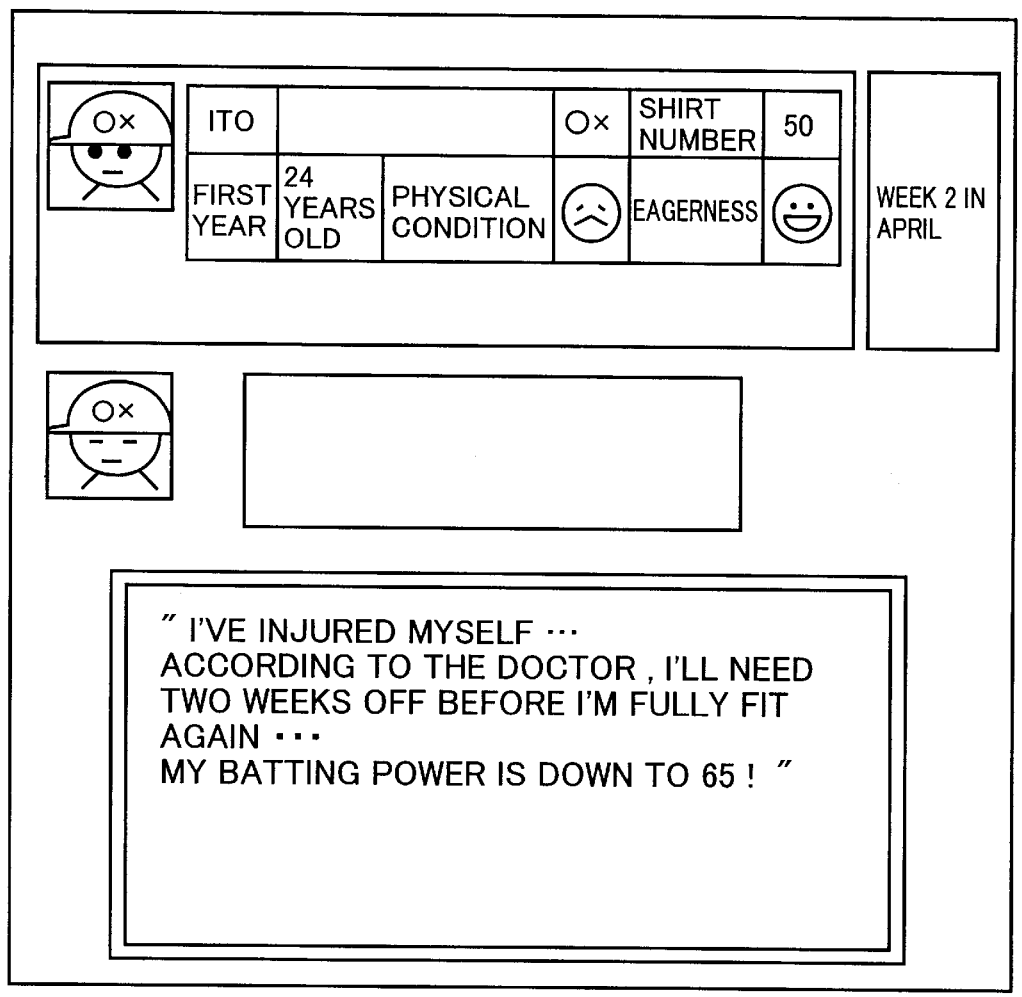
FIG. 41 is a diagram showing a screen where the competitor has been injured due to a negative event.
Figure 45:
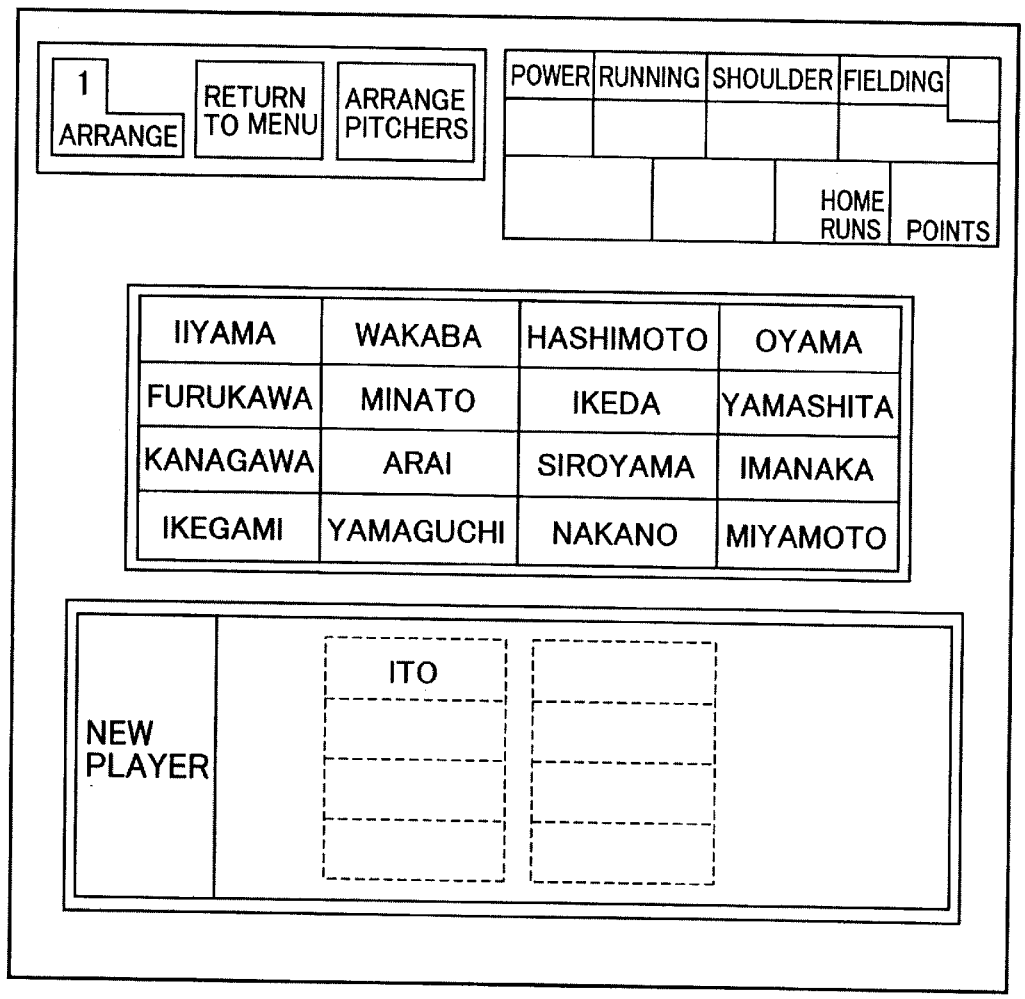
FIG. 45 is a diagram showing a screen for registering a main character as a new team member.

FIG. 41 is a screen showing a case where the character has suffered an injury due to a negative event. FIG. 42–FIG. 44 are as explained previously. FIG. 43 shows a display where the lower half of the table in FIG. 42 has been scrolled up, and similarly to FIG. 42 and FIG. 44, it allows the "remaining experience points" to be distributed. Here, the text "Current ability" and "After change" is not shown in the display. FIG. 45 is a screen for registering the main character as a new competitor, and when the new competitor is ordered to a major league team by the manager, the competitor's name is displayed in the grid below this screen and the competitor is able to play in a major league team.

Although not shown in the drawings, if the trained new competitor has moved up to a major league team, then when a competitive game is selected at the initial screen, that competitor becomes able to play in a major league match, and plays according to his abilities. The player is able to train new competitors one at a time, up to a maximum of eight.

Figure 46:
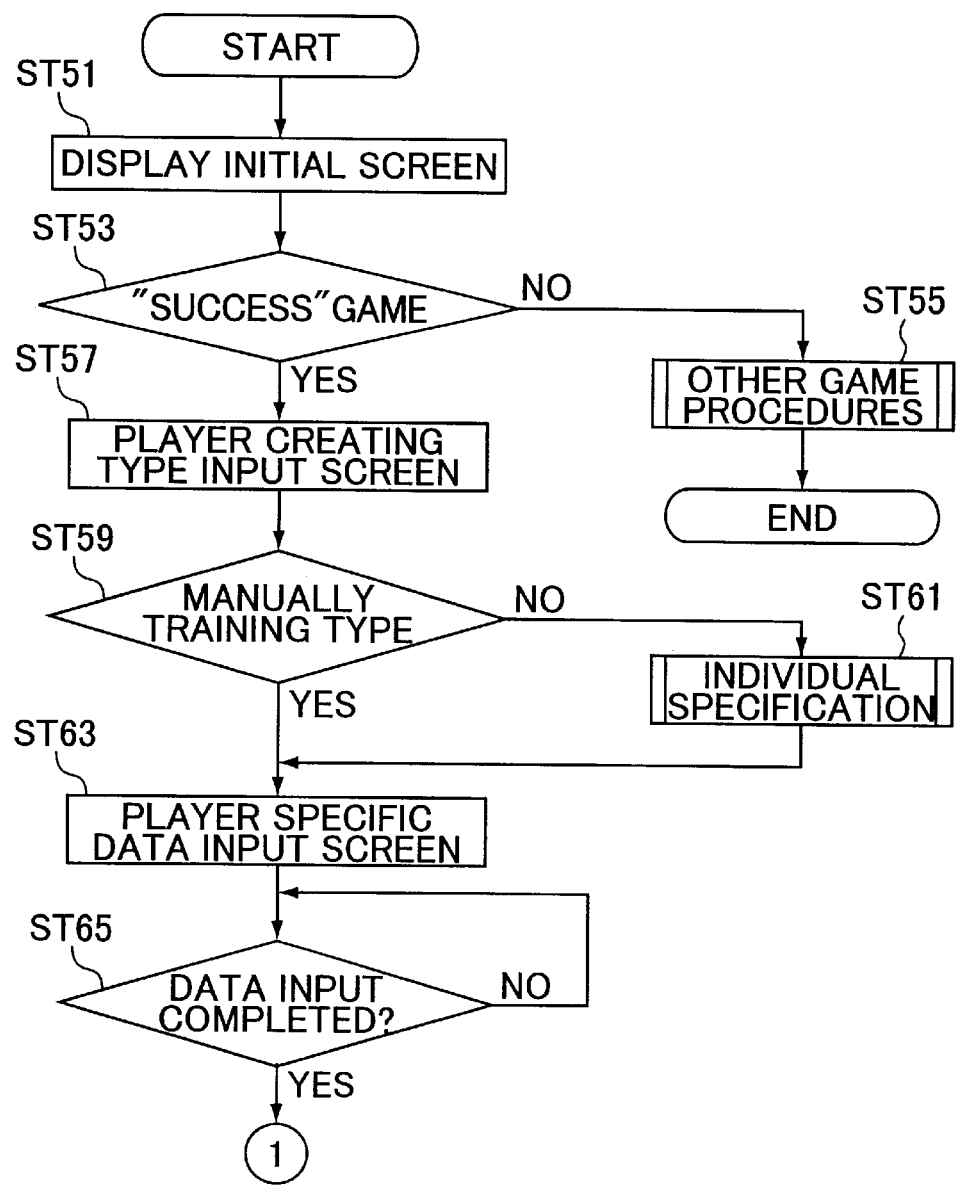
FIG. 46 is a flowchart showing a main routine for describing the procedure of a "Success" game.

Thereupon, the procedure for a "Success" game will be described with reference to FIG. 46. This "Success" game is a game where a new competitor joins a team, is trained to have characteristic abilities by repeating various practices and training other factors and psychological factors (speech and actions) until a prescribed number of years have passed, whilst also passing through a minor league trial on the orders of the coach, and finally, the competitor is promoted to a major league team on the orders of the manager.

Firstly, an initial screen display as shown in FIG. 30 is performed (step ST51), and on this screen, if the cursor is aligned with the "Success" icon by operating the cross-shaped button 6 and the operating key 24 is operated in this state, then "Success" is specified (YES at step ST53). If this does not occur, then another game procedure is executed (step ST55).

In the "Success" game, the created player type input screen illustrated in FIG. 31 is displayed (step ST57), and the player can choose whether or not to select a "Manually trained" type by using the cross-shaped button 6 and the first button 7 (step ST59, ST61). Next, a screen for inputting individual competitor data as illustrated in FIG. 32 is displayed (step ST63). Here, prescribed data is registered for each item by using the cross-shaped button 6 and the first button 7. When registration processing has been completed and the "End" button in FIG. 32 has been operated (step ST65), the game proceeds to the speech and action command screen shown in FIG. 33 (step ST67 in FIG. 47).

Figure 47:
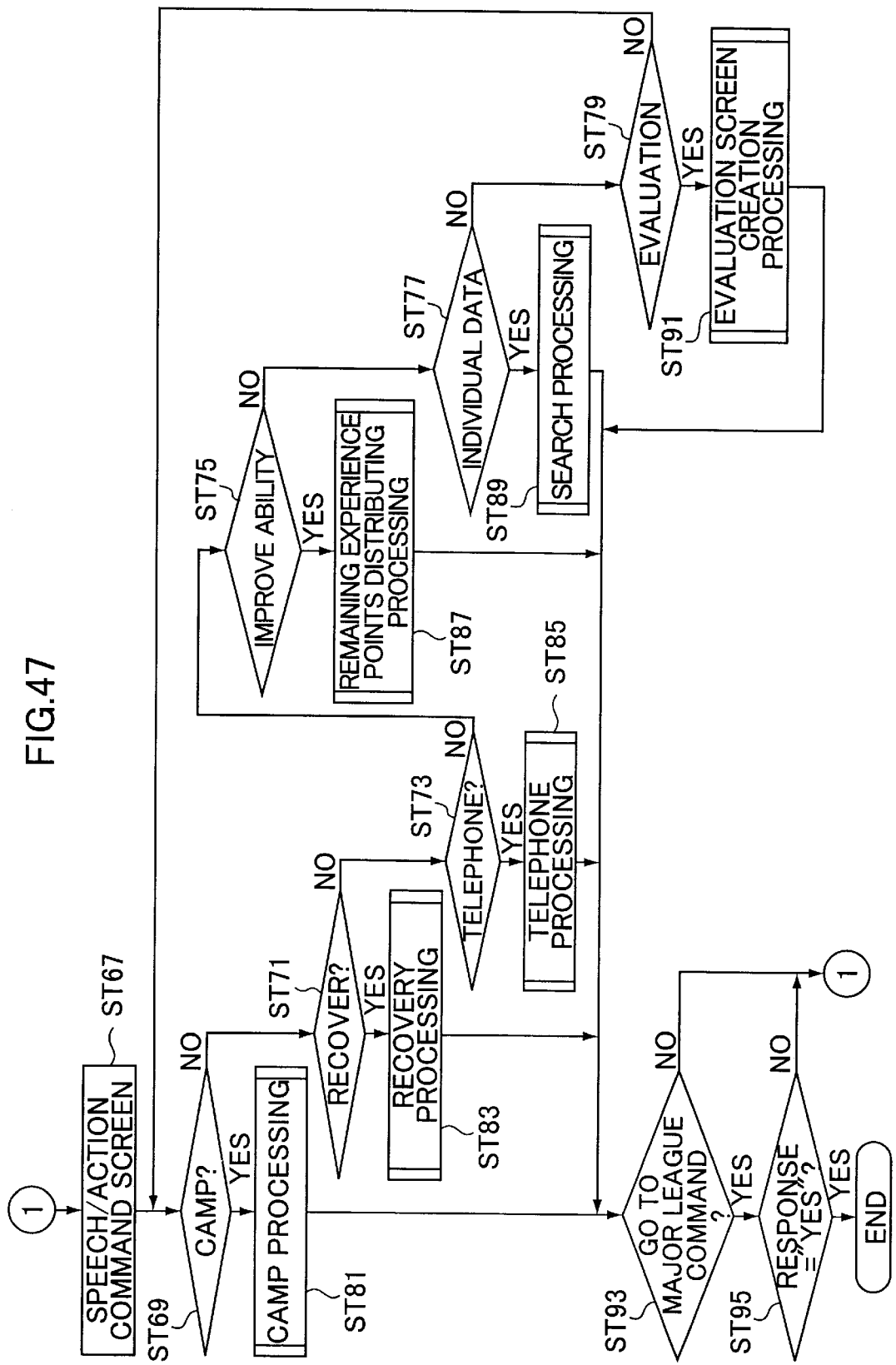
FIG. 47 is a is a flowchart showing a procedure of speech and action commands.

In FIG. 47, it is judged whether or not any of the options "Camp", "Recovery", "Telephone", "Upgrade ability", "Individual data" or "Evaluation" has been selected (steps ST69–ST79), and corresponding processing is executed accordingly (steps ST81–S91). These steps determine the status according to the development of the game. Thereupon, it is judged whether the manager has given a "go to major league" command (step ST93), and "Yes" and "No" are displayed. Here, if the player replies "Yes" by means of the cross-shaped button 6 and the first button 7, then the "Success" game is terminated and the present procedure is ended. Although not shown in the flow charts, if the player decides to interrupt the game at an intermediate stage, then by sending a reset command, or the like during a prescribed screen, the present procedure can be ended whilst saving the data to that point. Moreover, it may also be devised that the present procedure is terminated when a prescribed amount of time (for example, three years,) has passed.

Figure 48:
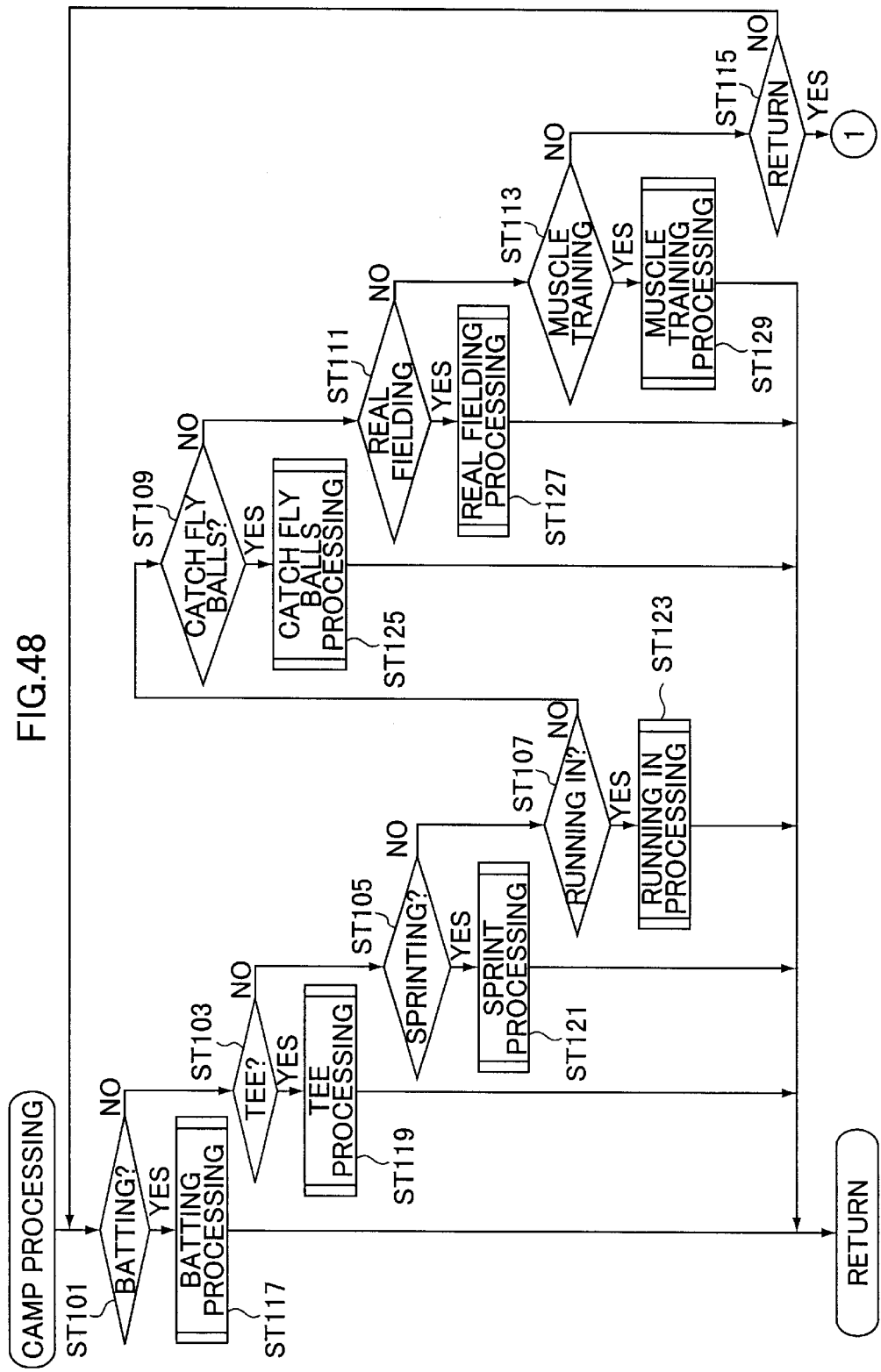
FIG. 48 is a flowchart showing a "Camp" game procedure.

In FIG. 33, if "Camp" is selected, for example, then the camp screen shown in FIG. 34 is displayed, and the procedure in FIG. 48 is executed. In FIG. 48, it is judged which of the options "Bat", "Tee", "Sprint" (where cursor positioned), "Run in". "Catch fly balls", "Real fielding", "Muscle training", has been selected (steps ST101–ST113), and corresponding processing is executed accordingly (step ST117–ST129), whereupon the routine returns. If "return" is selected, then the procedure moves to step ST67, and enters a loop until one of the options is specified (returns from NO at step ST115 to step ST101). The probability generated by the probability changing means 41 is essentially set to different values according to the respective practice contents.

Figure 49:
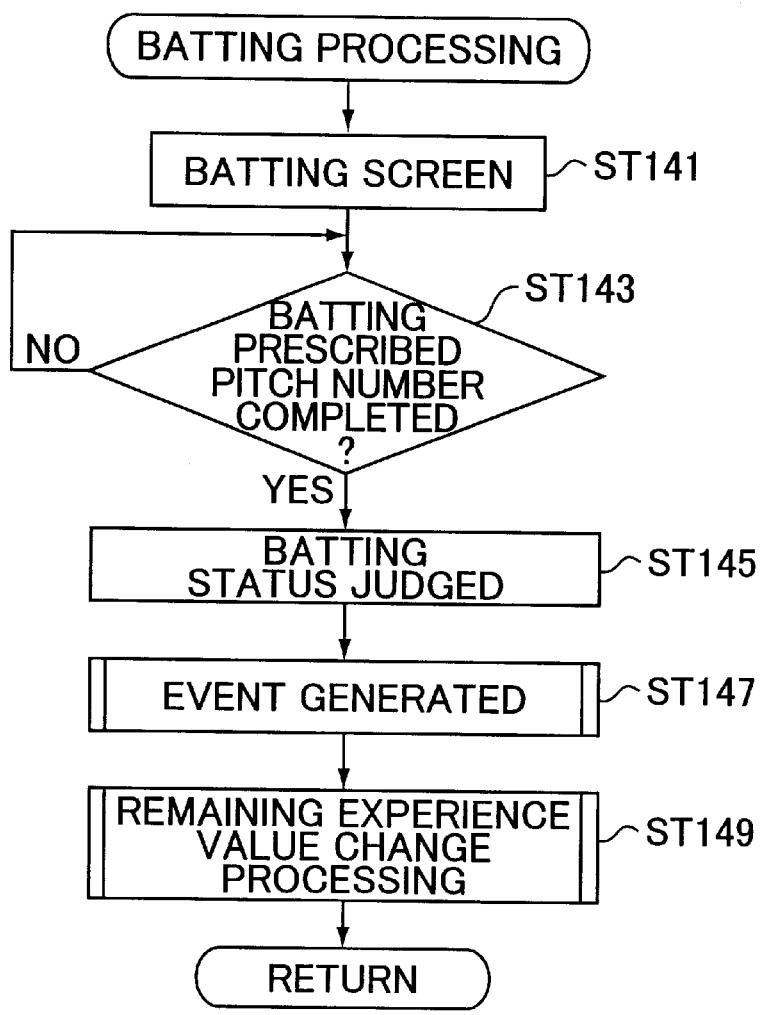
FIG. 49 is a flowchart where "Bat" has been selected.

In FIG. 34, if "Bat" is selected, then a screen similar to FIG. 39 is displayed, and batting practice is carried out in accordance with the procedure in FIG. 49. Firstly, a batting screen is displayed, and a batting pitcher pitches balls. The player instructs a swing operation with respect to the pitched balls by means of the first button 7, whilst using the cross-shaped button 6 to move the meet cursor MC on the screen. The results of this practice are shown on a screen similar to FIG. 40. When a prescribed number of balls (for example, 10 balls) have been pitched (step ST143), the results are judged (step ST145), and an event display is implemented, in addition to which a probability for addition and subtraction processing of the "remaining experience points" is set (step ST147, ST149). In other words, the probability changing means 41 changes the probability of points being added or subtracted, on the basis of the batting practice results, and if the batting practice results are good, in other words, if there were many hits, then the possibility of increase of the "technique" points in the "remaining experience points" is raised, or alternatively, the number of plus points is raised, whilst conversely, "physical condition" of the mind and body status is reduced, thereby achieving an approximately average effect on the overall state of the character. On the other hand, if the batting practice results are poor, then the probability of minus points is increased according to how poor the results are, and hence the "technique" points are reduced. Moreover, the plus and minus point probabilities also include factors, such as the current "physical condition", "morale" and "month/week", and the like, and fine probability setting can be implemented whereby the probability is changed with regard to the practice status in the previous "Camp" game.

Figure 50:
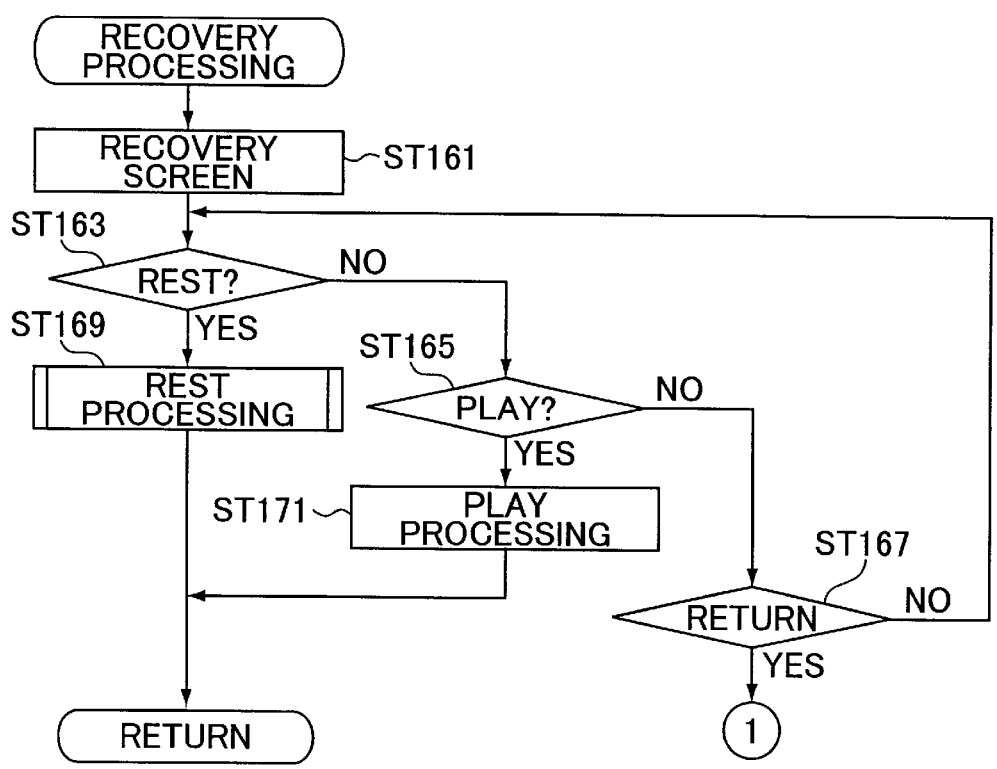
FIG. 50 is a flowchart where "Recovery" has been selected.

FIG. 50 is a flowchart of a case where "Recovery" is selected in FIG. 33. The corresponding screen is shown in FIG. 35. Here, firstly the recovery screen in FIG. 35 is displayed (step ST161), whereupon it is judged which of the options "Rest", "Play", "Return" has been selected (steps ST163–ST167), and corresponding processing is implemented accordingly (steps ST169–ST171). If recovery has been indicated, then the "physical condition" status and the "morale" status are improved (it is possible to apply differentials to the amount of increase in "physical condition" status and "morale" status, depending on whether "Rest" or "Play" is selected), whilst the "muscular strength" and "agility" factors in the "remaining experience points" are reduced on a probability basis. When "play" is selected, then if sport has been registered in the "hobbies" of the individual data (see FIG. 33), the reduction in "muscular strength" and "agility" is reduced, or the levels thereof are maintained.

Figure 51:
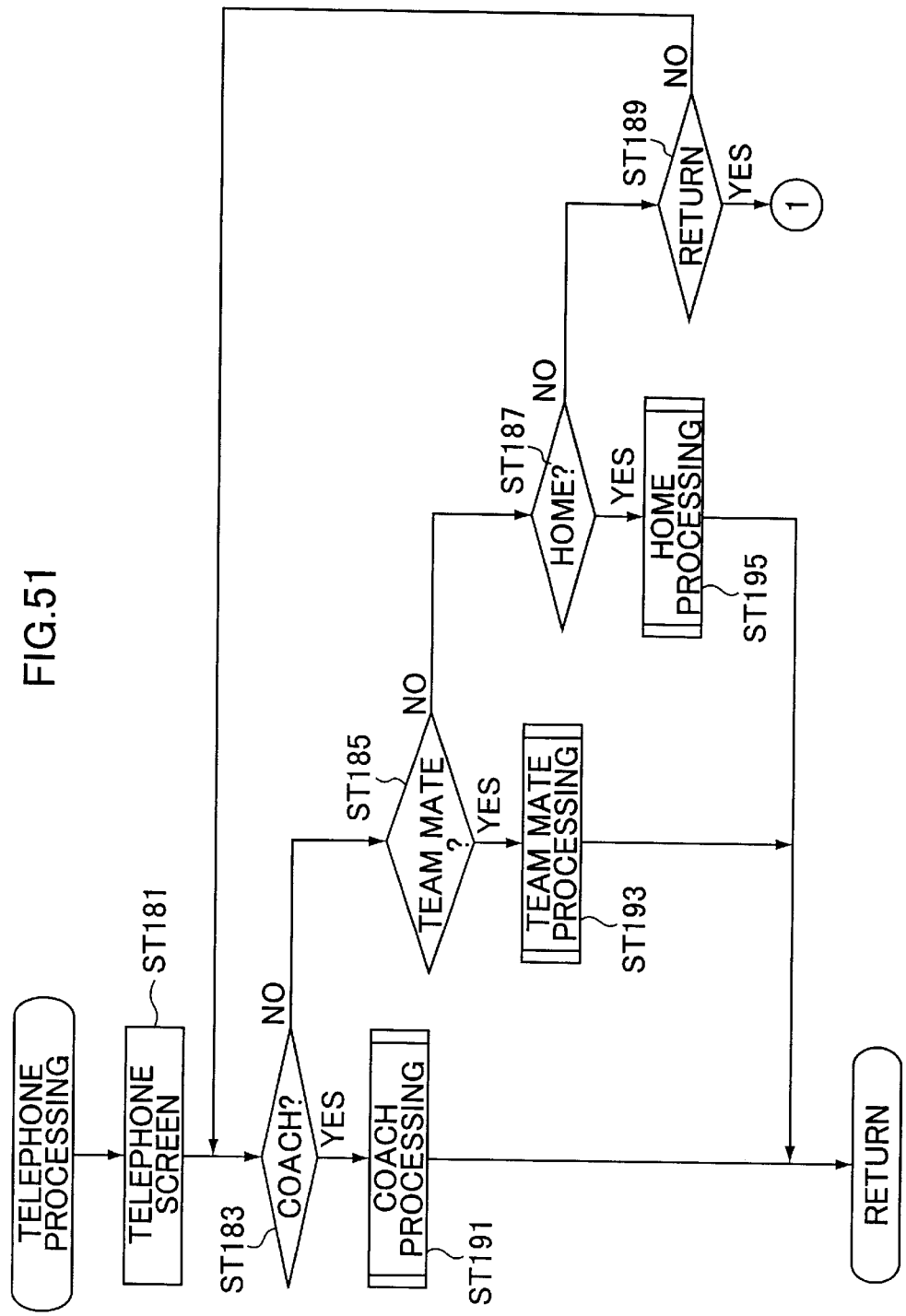
FIG. 51 is a flowchart where "Telephone" has been selected.

FIG. 51 is a flowchart of a case where "telephone" was selected in FIG. 36, and the corresponding display screen is FIG. 37. Here, firstly, a telephone screen is displayed (step ST181) and then it is judged which of the options "coach", "team mate" and "home" has been selected (step ST183–S189), and corresponding processing is executed accordingly (step ST191–S195). If the character telephones the "coach", then taking the practice to that point into account, the coach and manager's faith in the character is improved, the "morale" status is improved, and the changes of the character appearing in a minor league match trial are increased, whilst the faith of the team mates is reduced, the rate of generating minus points is increased, and the chance of the "remaining experience points" being reduced randomly is increased. If the character telephones a "team mate", then although this has no direct affect on the "remaining experience points", it increases the possibility of generating plus points, and consequently leads to an improved probability of raising the "remaining experience points". If the character telephones "home", then taking into account the practice history to that point, an increase or decline in the "morale" status is generated randomly.

FIG. 38–FIG. 40 show the transition of screens when the character is instructed to take part in a minor league trial match. FIG. 38 is a match appearance instruction screen, and FIG. 39 is an image of the character standing at the batting plate as a batter. In FIG. 39, the player causes the character to swing at a ball thrown by the pitcher, by operating the first button 7 whilst moving meet cursor MC in the up/down and left/right directions by means of the cross-shaped button 6. FIG. 40 shows a batting result, and the higher the number of hits, the more the trust of the manager and coach will increase, and the lower this number, the more this trust will decline, this increase or decrease also being reflected in the "morale". In this manner, by employing factors which are directly affected by the player's abilities as speech and action contents for the main character, it is possible to bring diversity to the training of a mc, and hence to achieve a highly interesting game.

Figure 52:
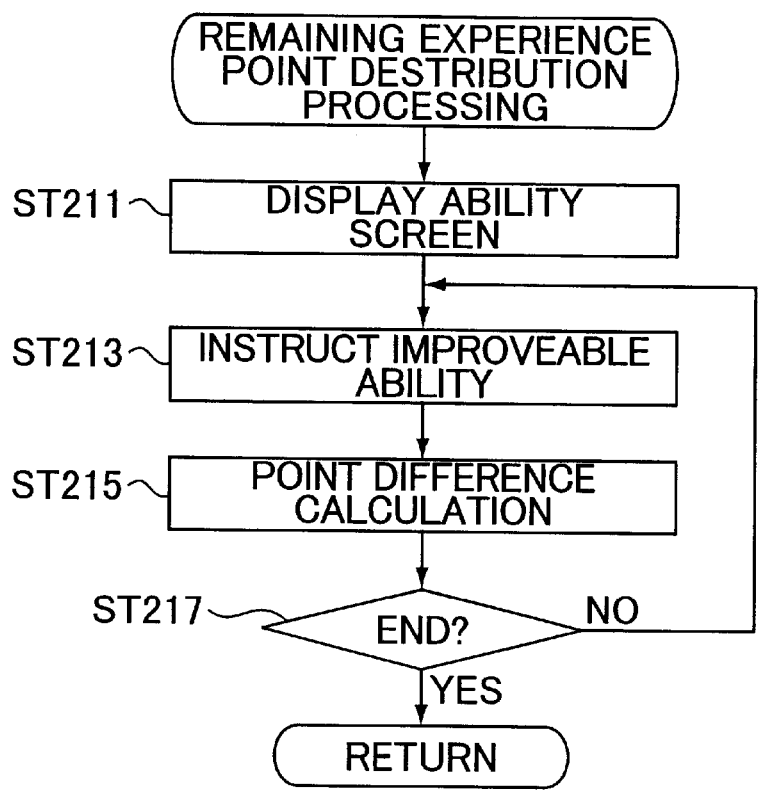
FIG. 52 is a flowchart showing processing for distributing "remaining experience points".

FIG. 52 is a flowchart of processing for distributing "remaining experience points". Firstly, the screens illustrated in FIG. 42 to FIG. 44 are displayed (step ST211). Here, if the player aligns the cross-shaped button 6 with the display region of the ability that he or she wishes to improve within the "abilities", and then operates the first button 7 (step ST213), then the 'current ability' is increased to the 'ability after change', by a number of ranks corresponding to the number of times the button is operated. When an ability is increased, the character's acquired points, namely, the "remaining experience points" are reduced accordingly (step ST215). Abilities can be improved in this manner until there are no acquired points remaining to be deducted, and furthermore, if the current meet circle is rank D, and this is improved (to rank C, for instance,) then the number of unit points required for improving abilities (in the example in FIG. 42, four points are required from the "muscular strength" in the "remaining experience points" in order to improve the "batting strength" by one rank) is increased. In this way, when required, ability upgrade processing can be performed from the screen in FIG. 33, and hence various abilities can be acquired by the main character, but on the other hand, "remaining experience points" cannot always be acquired in the desired manner.

The "success" mode comprises the following modes. Specifically, it is a video game device comprising: a display device for displaying a game character and the contents of speech and actions relating to same, and displaying menus corresponding to various speech and actions of the game character; an operating section whereby a menu relating to a desired speech or action can be specified selectively from the aforementioned variety of menus; speech and action storing means for storing speech and action contents for a game character in accordance with operating data from the aforementioned operating section; speech and action controlling means for reading out speech and action corresponding to instructions from the aforementioned operating section, from the aforementioned speech and action storing means, and causing the game character to implement same; which is further provided with: acquired points storing means for storing one type, or two or more types, of acquired points belonging to the game character; acquired points changing means for applying plus or minus points to the one or more types of acquired points in the acquired points storing means, according to the aforementioned speech and action selection contents; probability controlling means for causing the aforementioned application of plus or minus points to be performed according to a probability corresponding to the aforementioned speech and action selection contents; ability value storing means for storing a plurality of ability values indicating differentiated abilities; and ability value distributing means for distributing the acquired points stored in the aforementioned acquired points storing means to the plurality of ability values indicating differentiated abilities, by operating the aforementioned operating section, and updating the values stored in the aforementioned ability value storing means.

According to this composition, a plurality of menus are displayed on a video screen, and the operating section selects and specifies a required menu from these menus. Speech and action contents corresponding to the selected menu are executed and the plus or minus points are applied to the acquired points in accordance with a prescribed probability and the executed speech and action. If the speech and action content selection method is favourable, then points are added, and if not, then points are deducted. In this way, by obtaining as many acquired points as possible, and distributing these acquired points to required abilities, the player is able to increase the ability values for desired abilities. Accordingly, a highly interesting game is achieved.

Moreover, by preparing speech and action contents which depend on the operating ability of the player in at least one of the speech and action contents selected by the aforementioned operating section, the probability of the probability controlling means changes according to the results of the speech and action content performed by the player, and hence the player is directly involved in the training of the game character by means of their speech and action content.

Moreover, since the probability controlling means changes the probability by taking the contents of a plurality of speech and action selections into account, then the history of speech and action selections significantly affects the gaining of acquired points, and hence a more interesting game development can be achieved.

Moreover, in the aforementioned composition, by providing time passing means for causing a prescribed period of time to pass each time the operating section performs a menu selection operation, the aforementioned speech and action controlling means changes the speech and action content randomly according to the elapsed time status when the operating section selects a menu, and the probability controlling means changes the aforementioned probability according to the speech and action contents changed by the aforementioned speech and action controlling means, whereby a new element, namely, time, is reflected in the game development, a training course is more closely simulated, and the level of difficulty of the game can be increased, thereby achieving a more interesting game.

In the aforementioned composition, by providing mind and body status storing means for storing the mind and body status of the game character, and mind and body status changing means for changing the aforementioned mind and body status in accordance with the aforementioned speech and action selection contents, the aforementioned probability controlling means changes the probability according to the aforementioned mind and body status, and hence new factors, such as mind and body status, physical condition, morale, and the like, are reflected in the game development, thereby simulating a training course more closely and increasing the difficulty of the game, and hence achieving a more interesting game.

Moreover, in the aforementioned composition, competitive game controlling means for implementing a competitive game by means of the aforementioned display device is provided, and when a mode for executing a competitive game is selected from the mode for training the game character, the aforementioned competitive game controlling means causes the game character having ability values indicating the aforementioned differentiated abilities to appear in a competitive game, and controls the game character in such a manner that it performs actions according to the ability values in the competitive game, whereby a game character representing the player is trained to a condition proximate to abilities desired by the player, whereupon that game character is made to participate in a competitive game. In this competitive game, the game character performs actions according to its ability values.

A game character training control method for a video game implemented in a video game device comprising: a display device for displaying a game character and the contents of speech and actions relating to same, and displaying menus corresponding to various speech and actions of the game character; an operating section whereby a menu relating to a desired speech or action can be specified selectively from the aforementioned variety of menus; speech and action storing means for storing speech and action contents for a game character in accordance with operating data from the aforementioned operating section; and speech and action controlling means for reading out speech and action corresponding to instructions from the aforementioned operating section, from the aforementioned speech and action storing means, and causing the game character to implement same; whereby one type, or two or more types, of acquired points belonging to the game character are given; plus or minus points are applied to the given one or more types of acquired points and are updated in the acquired points storing means, according to the aforementioned speech and action selection contents; and the acquired points stored in the aforementioned acquired points storing means are distributed to a plurality of ability values indicating differentiated abilities, which are stored in the ability value storing means; and therefore, a plurality of menus are displayed on a video screen, and when a desired menu is selected by the operating section, speech and action content corresponding to the selected menu is executed, and plus or minus points corresponding to acquired points are applied according to a prescribed probability. If the selection method of the speech and action content is favourable, then points are added and if it is not favourable, then points are deducted. By obtaining as many acquired points as possible and distributing these acquired points to desired characteristics, a player can increase the ability values for desired abilities. Therefore, a more interesting game can be achieved.

A video game medium storing a game program for a video game wherein a variety of speech and actions for a game character are displayed on a display device, a menu corresponding to a desired speech and action is specified selectively by means of the operating section from the menus displayed, and a game character is caused to implement speech and action corresponding to instructions from the operating section, and furthermore, one or more types of acquired points are given to the game character, plus or minus points are applied to the given one or more types of acquired points, according to a probability corresponding to the aforementioned speech and action selection contents, and the acquired points are updated and stored, and the aforementioned stored acquired points are distributed to a plurality of ability values indicating differentiated abilities, which are stored, according to the operations of the aforementioned operating section.

As the video game medium, it is possible to use a cartridge containing a ROM or a RAM with internal battery as a storage medium, a CD-ROM recorded by an magneto-optical disk system, a floppy disk, or the like. Since this medium stores programs for executing games, speech and action content being executed in accordance with operating data from the operating section and acquired points being distributed readily to desired characteristic training points, simply by means of an instruction from the operating section, then it is possible to achieve highly interesting game development which is easy to operate, despite the fact that the game has a high degree of complexity and incorporates factors of varying probability.

It is also possible to provide a generic game by providing a "Success Battle version" as a selectable option in parallel with a game which aims to train a main character according to operating characteristics, by means of the "Success" mode.

The present invention is not limited to the various embodiments described above, and it is possible to adopt various modifications thereof as described below.

(1) In the Success Battle version embodiment, it was stated that the game contains an operation of returning to the home country from the mission destinations, but the present invention is not limited to this, and similar benefits may be obtained even if the mission destinations are selected successively in such a manner that the character moves from one mission destination to the next mission destination without passing via the home country. Moreover, it is also possible to adopt a mode where no home country is necessarily provided, and where there is no need to refer to a reference location, according to the specific type of destination location, or the action contents at that location.

(2) In the Success Battle version embodiment, the main character was dispatched to a home country and five mission destinations, but the mission destinations are not limited to five in number, and the game features can be preserved as long as there is a plurality of destinations. Moreover, instead of a mode where there is a battle involving the home country and mission destinations, it is also possible to adopt a mode using other game scenarios, for example, a variety of simple games where a reference location and a plurality of destination locations are set, in other words, a game which focuses rather on the player's ability in operating the operating section 4.

(3) In the Success Battle version embodiment, the game scenario was created by supposing that real-life simulation game spaces exist in relation to a map, but it is also possible to adopt artificial game spaces instead of these real-life simulation game spaces, and this artificial game space may be two-dimensional or three-dimensional.

(4) In the Success Battle version embodiment, it was stated that there three levels of danger are set for the tasks, but it is also possible to set two levels, or four or more levels. Moreover, for the task accomplishment result, in addition to a two-level result for success or failure, it is also possible to adopt a three-level result which includes a 'medium' outcome.

(5) The present invention may also be applied similarly to a domestic game device having a separate controller and CRT monitor, as well as to a portable game device.

(6) In the "Success Battle version", it is possible to obtain points other than the "remaining experience points" which are the basic abilities obtained in the "Success" game, directly, in other words, without the aforementioned distribution processing, and therefore it is possible to offer different types of game having a common purpose of training.

According to the first, thirteenth and fourteenth aspects of the present invention (corresponding to originally submitted claims 1, 13, and 14), it is possible to provide a game which is highly interesting and entertaining even for players which little game experience, whereby a player is able to achieve training of a character having abilities and characteristics desired by the player, without significantly reflecting the level of operating skill of the player.

According to the second aspect of the present invention (corresponding to originally submitted claim 2), it is possible to make a player concentrate more closely on the game, by preparing a realistic game space and enabling scenarios whereby the player moves between various scenes in that game space.

According to the third aspect of the present invention (corresponding to originally submitted claim 3), it is possible to provide a highly interesting game, which allows exercises to increase ability values.

According to the fourth aspect of the present invention (corresponding to originally submitted claim 4), it is possible to create the impression of moving to the scene displayed on the monitor.

According to the fifth aspect of the present invention (corresponding to originally submitted claim 5), it is possible to achieve variability and complexity, by causing a plurality of actions to be performed at a selected scene.

According to the sixth aspect of the present invention (corresponding to originally submitted claim 6), it is possible to improve game characteristics by assigning conditions according to the scene.

According to the seventh aspect of the present invention (corresponding to originally submitted claim 7), it is possible to obtain so-called special abilities by generating events in a random manner, and hence the game characteristics can be further enhanced.

According to the eighth aspect of the present invention (corresponding to originally submitted claim 8), it is possible to provide a more interesting game by creating conditions for the player to maintain the game, as the game progresses.

According to ninth and tenth aspects of the present invention (corresponding to originally submitted claims 9 and 10), it is possible to achieve diverse opportunities for acquiring ability values, by implementing multiple-choice type game at random during the course of the game.

According to the eleventh aspect of the present invention (corresponding to originally submitted claim 11), it is possible to terminate the game when the elapsed time period in the game has reached a first reference time period, and hence general compatibility is achieved.

According to the twelfth aspect of the present invention (corresponding to originally submitted claim 12), the end time point of the basic game is monitored by the game time period, and hence improvement in ability values can be achieved by means of success or failure with respect to time, thereby increasing the game interest.

This application is based on Japanese Patent Application Serial No. 2000-64115 filed on Mar. 8, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A readable storage medium storing a character training control program, which is a character framing game in which game screens containing a main character are displayed on a monitor and a plurality of types of ability values set for the main character are respectively increased as the main character is caused to perform prescribed actions in accordance with commands from an operating member, said character training control program comprising the steps of:

providing respective images for a plurality of scenes as game images;

preparing one or more predetermined actions for the main character at each scene;

setting plus or minus points for one or more specific abilities of said plurality of types of abilities in accordance with the success or failure of each action result;

specifying one of said scenes selectively according to operations of said operating member;

preparing respective actions set for each scene in correspondence with a plurality of success probabilities of successfully completing the respective actions, each of said success probabilities being selectable by said operating member, wherein the lower the success probability, the greater the increment value of the plus points corresponding to the success of said action result and the lower the decrement value of the minus points corresponding to the failure of said action result;

causing said main character to execute at least one of said actions with a prescribed success probability of successfully completing the at least one action at the specified scene;

adding or subtracting the specified plus or minus points to or from the corresponding ability values, respectively, according to the success or failure of the execution result; and implementing the aforementioned actions at each one of successively selected scenes until prescribed condition is reached to update the ability value for a desired ability.

2. The readable storage medium according to claim 1, wherein a map containing each scene is displayed on the monitor, and the respective scenes can be selected from said monitor by the operating member.

3. The readable storage medium according to claim 1, wherein said monitor displays a background image for a scene selected by the operating member, from background images corresponding to a plurality of scenes.

4. The readable storage medium according to claim 1, wherein at least a prescribed plural number of actions are implemented at the scene selected by the operating member.

5. The readable storage medium according to claim 1, wherein the selection corresponding to a specific scene of the plurality of scenes is enabled after prescribed condition has been cleared.

6. The readable storage medium according to claim 1, wherein previously prepared events are generated randomly during the implementation of actions at each scene, and if the event processing result is favourable, then an ability value in addition to the specific ability value set for that scene is added.

7. The readable storage medium according to claim 1, wherein a stamina index corresponding to a stamina of the main character is increased or decreased according to the action result, and if said stamina index falls to a prescribed threshold value, then a training failure is inferred and the game is compulsorily terminated.

8. The readable storage medium according to claim 7, wherein a reference scene is provided, and when moving from a selected scene to the reference scene after implementing said actions, a randomly generated multiple-choice-type genie is executed, and the stamina index is reduced by a prescribed value if the choice is unsuccessful.

9. The readable storage medium according to claim 8, wherein said multiple-choice-type game is a four-option game, and it is judged whether or not a randomly determined option matches the result selected by the operating member, the stamina index being reduced by a prescribed value if it is judged that the choice has been unsuccessful.

10. The readable storage medium according to claim 1, wherein a unit time set for the game is caused to elapse each time one action is performed, and provided that the elapsed time has reached a first reference time, upon an operating command from the operating member, the ability values accumulated thus far are registered in storing means as ability values for the main character, and the game is then terminated.

11. The readable storage medium according to claim 10, wherein a unit time set for the game is caused to elapse each time one action is performed, and when the elapsed time reaches a second reference time, the ability values accumulated thus far are registered in the storing means as ability values for the main character, and the game is then terminated.

12. A training-style video game device for training a character by displaying game screens containing a main character on a monitor and respectively increasing a plurality of types of ability values set for said main character as the main character is caused to perform prescribed actions in accordance with commands from an operating member, comprising:

first storing means for storing images for a plurality of scenes as game images;

second storing means for previously storing plus or minus points for one or more specific abilities of said plurality of types of abilities in accordance with one or more action contents for each scene and the success or failure of the action result;

action processing means for causing said main character to execute at least one action with a prescribed success probability of successfully completing the at least one action at a specified scene, in accordance with one of said scenes being specified selectively according to the operations of said operating member, the at least one action set for each scene being prepared in correspondence with a plurality of success probabilities of successfully completing the respective actions which include said prescribed success probability, each of said success probabilities being selectable by said operating member, wherein the lower the success probability, the greater the increment value of the plus points corresponding to the success of said action result and the lower the decrement value of the minus points corresponding to the failure of said action result;

calculating means for adding or subtracting said plus or minus points to or from the corresponding ability values according to the success or failure of the execution result; and development processing means for causing said action processing means to implement actions at each one of successively selected scenes, until prescribed condition is reached.

13. The training-style video game device according to claim 12, further comprising speech and action storing means for storing speech and action contents to be performed by the main character and speech and action controlling means for reading out speech and action from the speech and action storing means in accordance with the operation of the operating member.

14. The training-style video game device according to claim 13, further comprising time passing means for causing a prescribed period of time to pass each time one of selectable items, which relate to the speech and action to be performed by the main character, displayed on the monitor is selected by the operating member and said speech and action controlling means changes the speech and action content randomly in accordance with the elapsed time status when the one of the selectable items is selected by the operating member.

15. The training-style video game device according to claim 14, further comprising probability controlling means for changing the success probability in accordance with the speech and action content changed by the speech and action controlling means.

16. A character training control method for a character training game in which game screens containing a main character are displayed on a monitor and a plurality of types of ability values set for said main character are respectively increased as the main character is caused to perform prescribed actions in accordance with commands from an operating member, said control method comprising the steps of:

providing respective images for a plurality of scenes as game images;

preparing one or more predetermined actions for the main character at each scene;

setting plus or minus points for one or more specific abilities of said plurality of types of abilities in accordance with the success or failure of each action result;

specifying one of said scenes selectively according to operations of said operating member;

preparing respective actions set for each scene in correspondence with a plurality of success probabilities of successfully completing the respective actions, each of said success probabilities being selectable by said operating member, wherein the lower the success probability, the greater the increment value of the plus points corresponding to the success of said action result and the lower the decrement value of the minus points corresponding to the failure of said action result;

causing said main character to execute at least one of said actions with a prescribed success probability of successfully completing the at least one action at the specified scene;

adding or subtracting the specified plus or minus points to or from the corresponding ability values according to the success or failure of the execution result; and implementing the aforementioned actions at each one of successively selected scenes until prescribed condition is reached to update the ability value for a desired ability.

* * * * *